(12) United States Patent
Oshikiri

(10) Patent No.: US 8,688,440 B2
(45) Date of Patent: *Apr. 1, 2014

(54) CODING APPARATUS, DECODING APPARATUS, CODING METHOD AND DECODING METHOD

(71) Applicant: Panasonic Corporation, Osaka (JP)

(72) Inventor: Masahiro Oshikiri, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/889,983

(22) Filed: May 8, 2013

(65) Prior Publication Data

US 2013/0246075 A1    Sep. 19, 2013

Related U.S. Application Data

(63) Continuation of application No. 11/596,254, filed as application No. PCT/JP2005/008963 on May 17, 2005, now Pat. No. 8,463,602.

(30) Foreign Application Priority Data

May 19, 2004    (JP) .................................. 2004-148901

(51) Int. Cl.
*G06F 15/00* (2006.01)
*G10L 11/00* (2006.01)
*G10L 21/00* (2013.01)
*G10L 25/00* (2013.01)

(52) U.S. Cl.
USPC ......... 704/225; 704/200; 704/200.1; 704/205

(58) Field of Classification Search
USPC ........................................ 704/205, 219, 500
See application file for complete search history.

(56) References Cited

U.S. PATENT DOCUMENTS 5,444,487 A * 8/1995 Kondo et al. ............ 375/240.03
5,455,888 A * 10/1995 Iyengar et al. ................ 704/203
5,687,191 A * 11/1997 Lee et al. ....................... 375/216

(Continued)

FOREIGN PATENT DOCUMENTS

EP    1 744 139    1/2007
GB    2 188 820    10/1987

(Continued)

OTHER PUBLICATIONS

PCT International Search Report dated Jun. 28, 2005.

(Continued)

*Primary Examiner* — Pierre-Louis Desir
*Assistant Examiner* — Matthew Baker
(74) *Attorney, Agent, or Firm* — Dickinson Wright PLLC

(57) ABSTRACT

There is disclosed an encoding device capable of improving similarity between the high frequency band spectrum of the original signal and a new spectrum to be generated while realizing a low bit rate when encoding a wide-band signal spectrum. The encoding device has sub-band amplitude calculation units for calculating the amplitude of the respective sub-bands for the high frequency band spectrum obtained from the wide-band signal. A search unit and a gain codebook select some sub-bands from a plurality of sub-bands and only the gain of the selected sub-bands is subjected to encoding. An interpolation unit expresses the gain of the sub-band not selected, by mutually interpolating the selected gains.

11 Claims, 34 Drawing Sheets

(56) References Cited

U.S. PATENT DOCUMENTS

| | | | |
|---|---|---|---|
| 5,744,742 A * | 4/1998 | Lindemann et al. | 84/623 |
| 5,765,127 A | 6/1998 | Nishiguchi et al. | |
| 5,953,697 A * | 9/1999 | Lin et al. | 704/225 |
| 6,324,505 B1 * | 11/2001 | Choy et al. | 704/230 |
| 6,449,596 B1 * | 9/2002 | Ejima | 704/501 |
| 6,615,169 B1 * | 9/2003 | Ojala et al. | 704/205 |
| 6,675,144 B1 * | 1/2004 | Tucker et al. | 704/264 |
| 6,680,972 B1 | 1/2004 | Liljeryd | |
| 6,691,082 B1 * | 2/2004 | Aguilar et al. | 704/219 |
| 6,691,083 B1 * | 2/2004 | Breen | 704/220 |
| 6,708,145 B1 * | 3/2004 | Liljeryd et al. | 704/200.1 |
| 6,795,805 B1 * | 9/2004 | Bessette et al. | 704/223 |
| 6,807,524 B1 * | 10/2004 | Bessette et al. | 704/200.1 |
| 6,889,182 B2 * | 5/2005 | Gustafsson | 704/205 |
| 6,895,375 B2 * | 5/2005 | Malah et al. | 704/219 |
| 6,925,116 B2 * | 8/2005 | Liljeryd et al. | 375/240 |
| 6,931,373 B1 * | 8/2005 | Bhaskar et al. | 704/230 |
| 6,950,794 B1 * | 9/2005 | Subramaniam et al. | 704/200.1 |
| 6,988,066 B2 * | 1/2006 | Malah | 704/219 |
| 7,039,581 B1 * | 5/2006 | Stachurski et al. | 704/205 |
| 7,069,212 B2 * | 6/2006 | Tanaka et al. | 704/225 |
| 7,136,810 B2 * | 11/2006 | Paksoy et al. | 704/219 |
| 7,139,700 B1 * | 11/2006 | Stachurski et al. | 704/207 |
| 7,283,955 B2 * | 10/2007 | Liljeryd et al. | 704/219 |
| 7,318,035 B2 * | 1/2008 | Andersen et al. | 704/500 |
| 7,447,631 B2 * | 11/2008 | Truman et al. | 704/230 |
| 7,469,206 B2 * | 12/2008 | Kjorling et al. | 704/205 |
| 7,529,660 B2 * | 5/2009 | Bessette et al. | 704/205 |
| 7,805,293 B2 * | 9/2010 | Takada et al. | 704/205 |
| 7,899,676 B2 * | 3/2011 | Honma et al. | 704/500 |
| 2002/0052738 A1 * | 5/2002 | Paksoy et al. | 704/219 |
| 2003/0009327 A1 * | 1/2003 | Nilsson et al. | 704/219 |
| 2003/0093271 A1 | 5/2003 | Tsushima | |
| 2003/0093278 A1 * | 5/2003 | Malah | 704/265 |
| 2003/0142746 A1 * | 7/2003 | Tanaka et al. | 375/240.11 |
| 2004/0078194 A1 * | 4/2004 | Liljeryd et al. | 704/200.1 |
| 2005/0143981 A1 | 6/2005 | Koyanagi | |
| 2005/0149339 A1 | 7/2005 | Tanaka | |
| 2005/0163323 A1 | 7/2005 | Oshikiri | |
| 2005/0252361 A1 | 11/2005 | Oshikiri | |

FOREIGN PATENT DOCUMENTS

| | | |
|---|---|---|
| JP | 5-265487 | 10/1993 |
| JP | 2001-521648 | 11/2001 |
| JP | 2002-123298 | 4/2002 |
| JP | 2003-216190 | 7/2003 |
| JP | 2003-255973 | 9/2003 |
| JP | 2003-323199 | 11/2003 |
| JP | 2004-4530 | 1/2004 |
| JP | 2004-101720 | 4/2004 |
| JP | 2004-198485 | 7/2004 |
| JP | 2005-4119 | 1/2005 |
| WO | 01/95496 | 12/2001 |

OTHER PUBLICATIONS

Supplementary European Search Report dated Sep. 11, 2007.
H. Carl et al., "Bandwidth Enhancement of Narrow-Band Speech Signals," Signal Processing: Theories and Applications, Sep. 13, 2009, pp. 1178-1181.
J.R. Epps, et al., "A New Low Bit Rate Wideband Speech Coder With a Sinusodial Highband Model," ISCAS 2001, Proceedings of the 2001 IEEE International Symposium on Circuits and Systems, Sydney Australia, May 6-9, 2001, IEEE International Symposium on Circuits and Systems, New York NY: IEEE, US, vol. 1 of 5, May 6, 2001, pp. 349-352.
Oomen, Werner; Schuijers, Erik; den Brinker, Bert; Breebaart, Jeroen. Philips Digital Systems Laboratories, Eindhoven, The Netherlands; Philips Research Laboratories, Eindhoven, The Netherlands. AES Convention:114 (Mar. 2003) Paper No. 5852.
den Brinker, Albertus C.; Schuijers, Erik; Oomen, Werner. Parametric Coding for High-Quality Audio. AES Convention: 112 (Apr. 2002) Paper No. 5554. Affiliations: Philips Research Laboratories, Eindhoven, The Netherlands; Philips Digital Systems Laboratories.

* cited by examiner

CODING APPARATUS, DECODING APPARATUS, CODING METHOD AND DECODING METHOD

CROSS REFERENCE TO RELATED APPLICATIONS

This is a continuation application of application Ser. No. 11/596,254 filed Nov. 13, 2006, which is a 371 application of PCT/JP2005/008963 filed May 17, 2005, which is based on Japanese Application No. 2004-148901 filed May 19, 2004, the entire contents of each of which are incorporated by reference herein.

TECHNICAL FIELD

The present invention relates to a coding apparatus that codes the spectrum of a wideband voice signal, audio signal, or the like, a decoding apparatus, and a method thereof.

BACKGROUND ART

In the voice coding field, typical methods of coding a 50 Hz to 7 kHz wideband signal include the G722 and G722.1 standards of the ITU-T, and AMR-WB proposed by 3GPP (The 3rd Generation Partnership Project). According to these coding methods, it is possible to perform coding of wideband voice signals with bit rates of 6.6 kbit/s to 64 kbit/s. However, the quality of such a signal, although high compared with a narrowband signal, is not adequate for audio signals or when more realistic quality is required of a voice signal.

Generally, realism equivalent to FM radio can be obtained if the maximum frequency of a signal is extended to around 10 to 15 kHz, and CD quality can be obtained if the maximum frequency is extended to around 20 kHz. An audio signal coding method such as the Layer 3 method standardized by the MPEG (Moving Picture Expert Group) or the AAC (Advanced audio coding) method is generally used for coding of such wideband signals. However, with these audio coding methods the bit rate of the coding parameter is high because the frequency band subject to coding is wide.

As a technology for performing high-quality coding of a wideband signal spectrum at a low bit rate, a technology is disclosed in Patent Document 1 whereby the overall bit rate is reduced while suppressing quality degradation by replacing a high frequency band spectrum within a wideband spectrum with a duplicate of a low frequency band spectrum, and then performing envelope adjustment.

Also, in Patent Document 2 a technology is disclosed whereby the bit rate is reduced by dividing a spectrum into a plurality of subbands, calculating gain on a subband-by-subband basis and generating a gain vector, and performing vector quantization of this gain vector.

Patent Document 1: Japanese Patent Publication Laid-Open No. 2001-521648 (p. 15, FIG. 1, FIG. 2)
Patent Document 2: Japanese Patent Application Laid-Open No. HEI 5-265487

DISCLOSURE OF INVENTION

Problems to be Solved by the Invention

FIGS. 1A through 1D are graphs showing spectra when the technology disclosed in Patent Document 1 is applied to a 0≤k<FH frequency band original signal.

FIG. 1A shows the original signal spectrum, FIG. 1B the low frequency band spectrum after elimination of the high frequency band (FL≤k<FH) of the original signal spectrum, FIG. 1C the spectrum of the entire band obtained by inserting a duplicate of the low frequency band spectrum in FIG. 1B into the high frequency band, and FIG. 1D the spectrum after envelope adjustment of the high frequency band.

The reason for performing envelope adjustment after replacing the high frequency band spectrum with a duplicate of the low frequency band spectrum in this way is that it is known that major quality degradation will occur if the outline of the newly generated high frequency band spectrum (duplicate spectrum) differs greatly from the outline of the high frequency band spectrum of the original signal. Therefore, improving the similarity between the high frequency band spectrum of the original signal and the newly generated spectrum by adjusting the outline of the newly generated high frequency band spectrum is extremely important.

A possible method of adjusting the outline of the high frequency band spectrum is, for example, to multiply the duplicate spectrum by an adjustment coefficient (gain) so that the energy of the duplicate spectrum matches the energy of the high frequency band spectrum of the original signal. FIGS. 2A and 2B are graphs showing an example of the outline of a spectrum obtained by processing that multiplies this duplicate spectrum by gain.

FIG. 2A shows the outline of the spectrum of the original signal, and FIG. 2B shows the outline of the spectrum after outline adjustment.

As can be seen from these figures, when the above-described spectrum outline adjustment is performed, the following problem arises in the obtained spectrum. Namely, a discontinuity occurs at the juncture of the low frequency band spectrum and high frequency band spectrum, causing an degraded sound. This is because, since the entire high frequency band spectrum is multiplied uniformly by the same gain, the energy of the high frequency band spectrum matches that of the original signal, but continuity is not necessarily maintained between the low frequency band spectrum and high frequency band spectrum. Also, if there is a characteristic shape in the outline of the low frequency band spectrum, simply multiplying by the same uniform gain will result in that characteristic shape remaining inappropriately, which will also contribute to degradation of sound quality.

Another possibility is, for example, application of the technology of Patent Document 2 to the above-described spectrum outline adjustment—that is, dividing the signal into subbands and then performing outline adjustment by adjusting gain on a subband-by-subband basis. FIGS. 3A and 3B are graphs showing an example of the outline of a spectrum obtained by this processing.

FIG. 3A shows the outline of the spectrum of the original signal, and FIG. 3B shows the outline of the spectrum when the signal has been divided into subbands and the gain of each subband has been adjusted.

As can be seen from these figures, when the technology of Patent Document 2 is applied, the shape of the high frequency band spectrum may be inaccurate (it may not be possible to reproduce the shape of the original signal). This happens because, in the method whereby gain is adjusted on a subband-by-subband basis, a sufficient number of bits are not distributed when the number of subbands is increased and a large number of bits are fundamentally necessary in order to perform coding with good precision. This situation may naturally occur since the whole point of replacing the high frequency band spectrum with a duplicate of the low frequency band spectrum is to achieve a lower bit rate.

As explained above, with a conventional method, when coding a wideband signal spectrum it is difficult to improve the similarity between a high frequency band spectrum of the original signal and a newly generated spectrum while achieving a lowering of the bit rate.

Thus, it is an object of the present invention to provide a coding apparatus and coding method that enable the similarity between a high frequency band spectrum of an original signal and a newly generated spectrum to be improved while achieving a lowering of the bit rate when coding a wideband signal spectrum.

Means for Solving the Problems

A coding apparatus of the present invention employs a configuration that includes: an acquisition section that acquires a spectrum divided into at least a low frequency band and a high frequency band; a first coding section that codes the tow frequency band spectrum; a second coding section that codes the shape of the high frequency band spectrum; a third coding section that codes only gain of a specific location of the high frequency band spectrum; and an output section that outputs coded information obtained by the first, second, and third coding sections.

Advantageous Effect of the Invention

The present invention enables the similarity between a high frequency band spectrum of an original signal and a newly generated spectrum to be improved while achieving a lowering of the bit rate when coding a wideband signal spectrum.

BEST MODE FOR CARRYING OUT THE INVENTION

Embodiments of the present invention will now be described in detail with reference to the accompanying drawings. Here, cases in which an audio signal or voice signal is coded/decoded will be described as an example. Two cases can broadly be considered for the present invention: a first case in which it is applied to normal coding (non-scalable coding), and a second case in which it is applied to scalable coding. The first case will be described in Embodiment 1, and the second case in Embodiment 2.

Embodiment 1

Figure 1A:
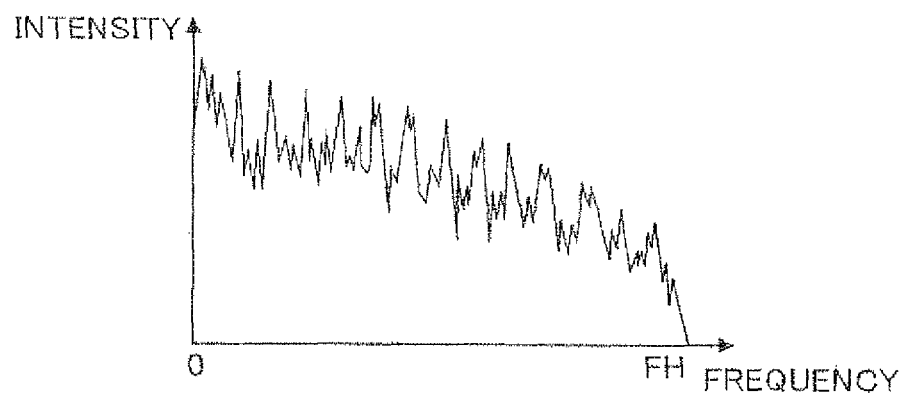
FIG. 1A is a graph showing the spectrum of an original signal.
Figure 1B:
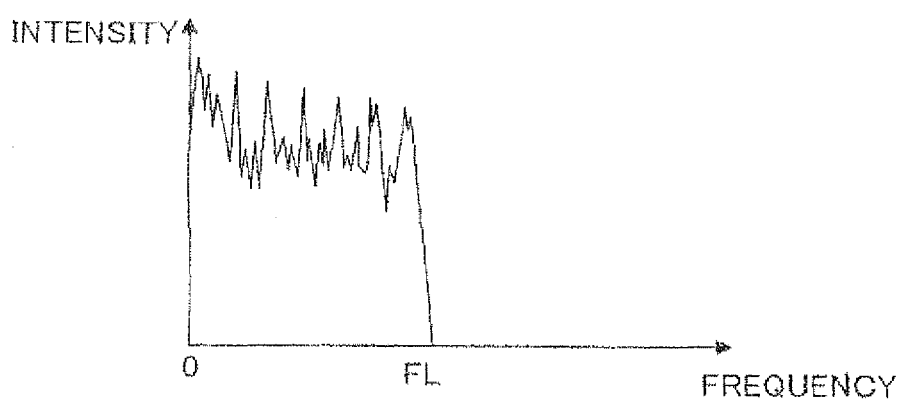
FIG. 1B is a graph showing a low frequency band spectrum after a high frequency band of the spectrum of the original signal has been eliminated.
Figure 1C:
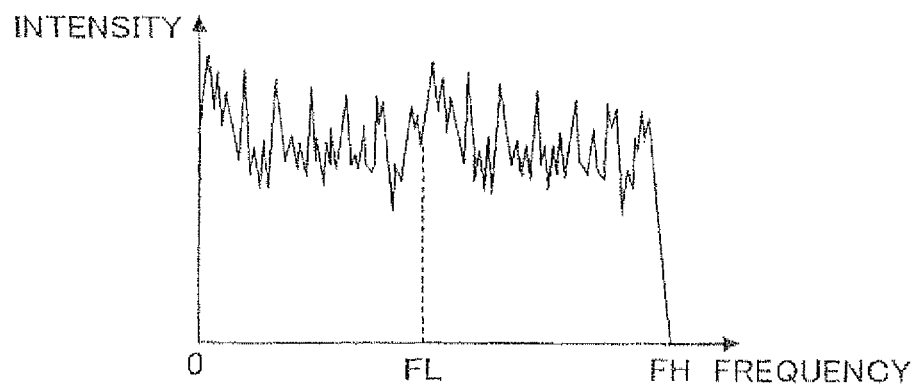
FIG. 1C is a graph showing the spectrum of the entire band obtained by inserting a duplicate of the low frequency band spectrum into the high frequency band.
Figure 1D:
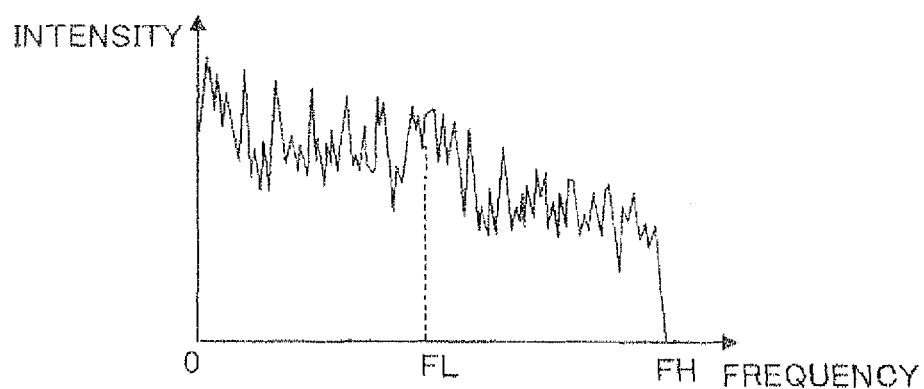
FIG. 1D is a graph showing the spectrum after envelope adjustment of the high frequency band.
Figure 2A:
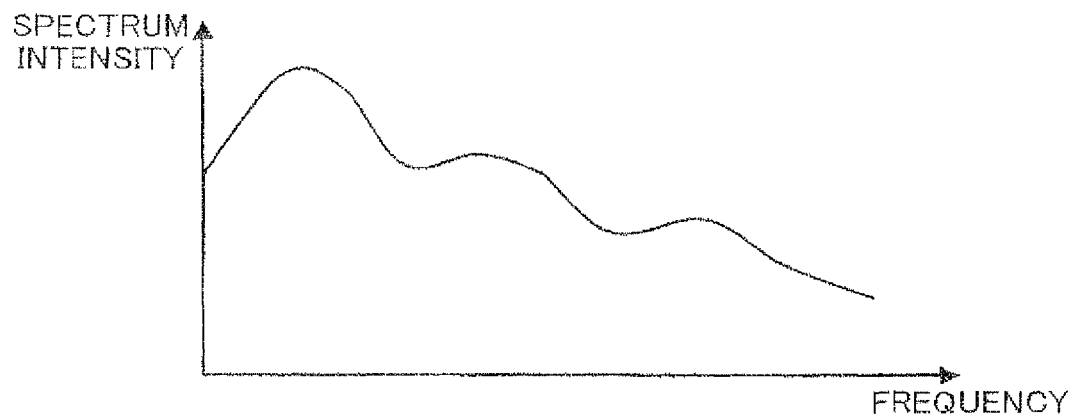
FIG. 2A is a graph showing the outline of the spectrum of an original signal.
Figure 2B:
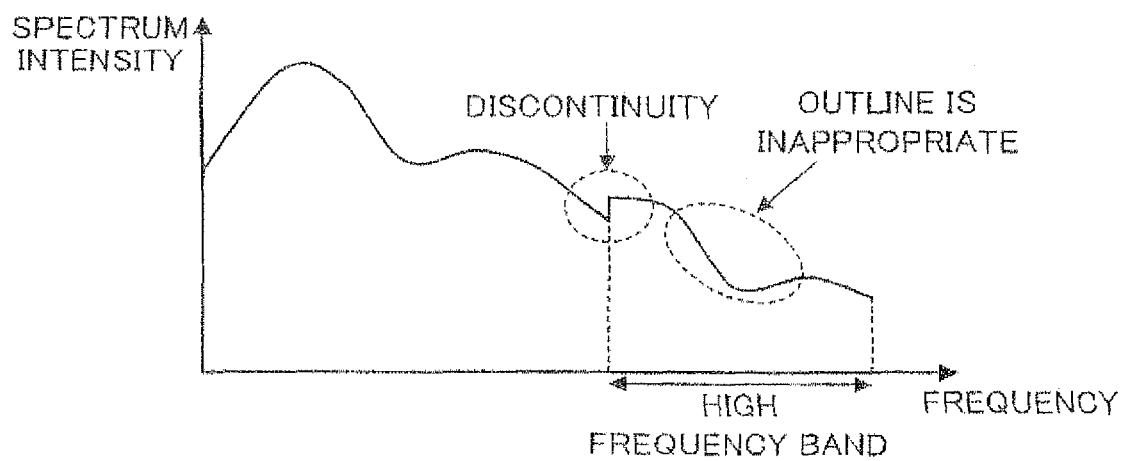
FIG. 2B is a graph showing the outline of the spectrum after outline adjustment.
Figure 3A:
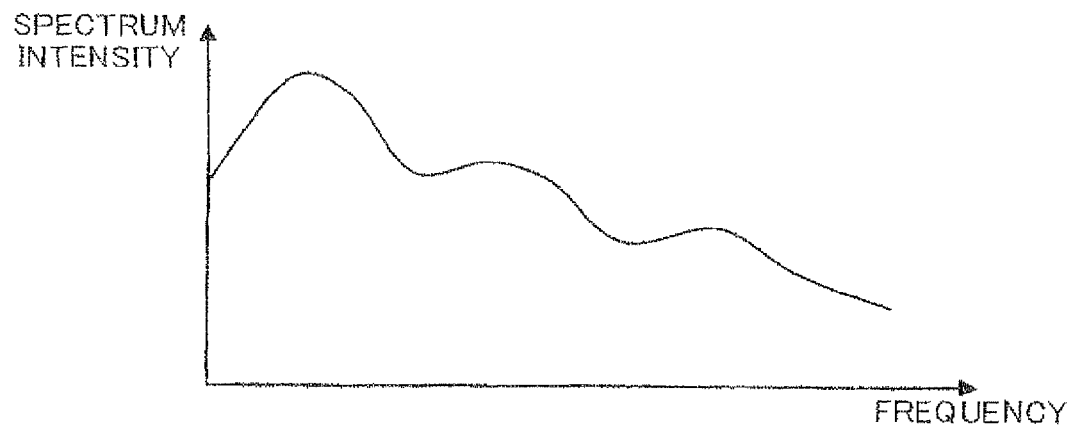
FIG. 3A is a graph showing the outline of the spectrum of an original signal.
Figure 3B:
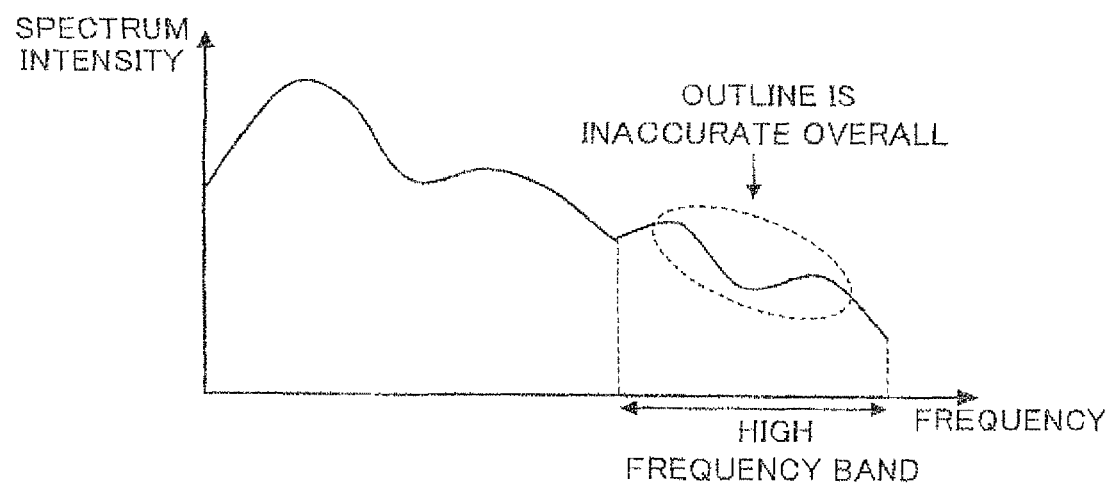
FIG. 3B is a graph showing the outline of the spectrum when the signal has been divided into subbands and the gain of each subband has been adjusted.
Figure 4:
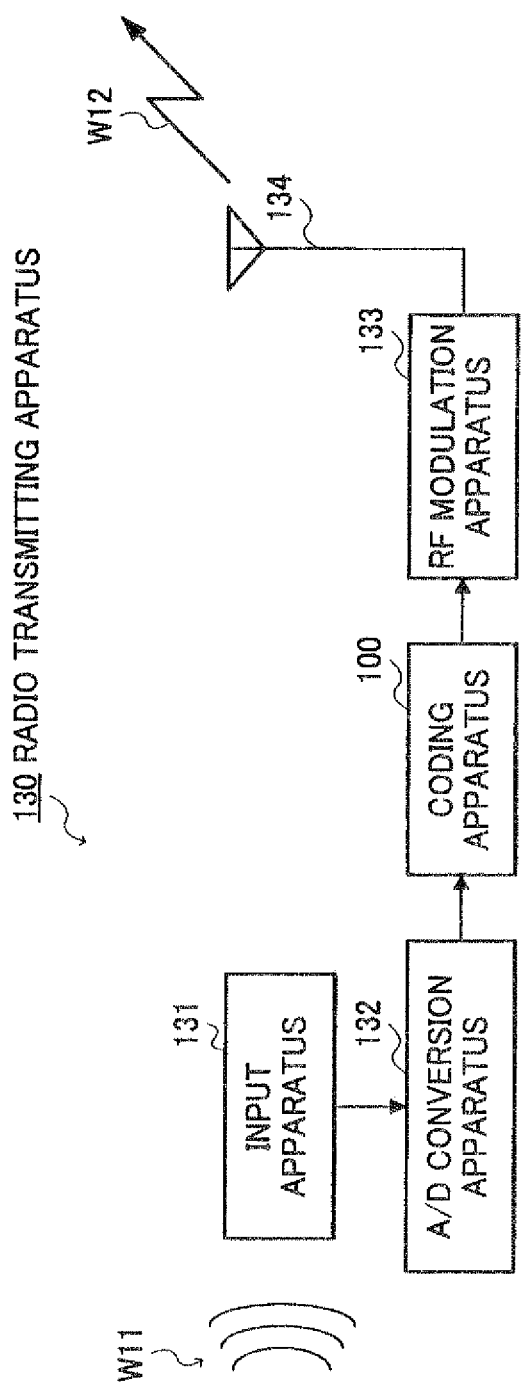
FIG. 4 is a block diagram showing the main configuration elements of a radio transmitting apparatus according to Embodiment 1.

FIG. 4 is a block diagram showing the main configuration elements of a radio transmitting apparatus 130 when a coding apparatus according to Embodiment 1 of the present invention is provided on the transmitting side of a radio communication system.

This radio transmitting apparatus 130 has a coding apparatus 100, an input apparatus 131, an A/D conversion apparatus 132, an RF modulation apparatus 133, and an antenna 134.

Input apparatus 131 converts a sound wave W11 audible to the human ear to an analog signal that is an electrical signal, and outputs this signal to A/D conversion apparatus 132. A/D conversion apparatus 132 converts this analog signal to a digital signal, and outputs this signal to coding apparatus 100. Coding apparatus 100 codes the input digital signal and generates a coded signal, and outputs this signal to RF modulation apparatus 133. RF modulation apparatus 133 modulates the coded signal and generates a modulated coded signal, and outputs this signal to antenna 134. Antenna 134 transmits the modulated coded signal as a radio wave W12.

Figure 5:
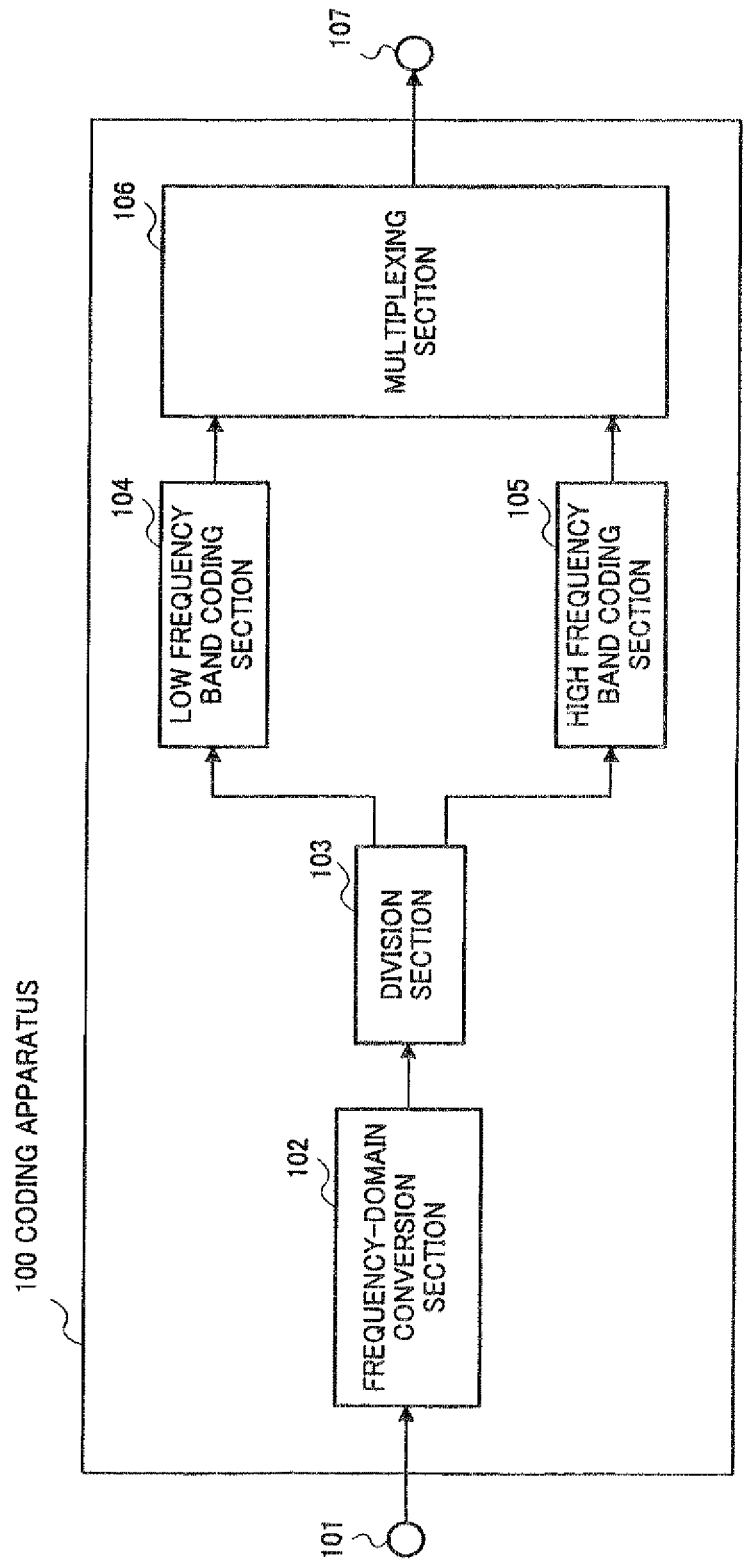
FIG. 5 is a block diagram showing the main internal configuration elements of a coding apparatus according to Embodiment 1.

FIG. 5 is a block diagram showing the main internal configuration elements of above-described coding apparatus 100. As an example, a case will here be described in which a time-domain digital signal is input, and this signal is converted to a frequency-domain signal before being coded.

Coding apparatus 100 has an input terminal 101, a frequency-domain conversion section 102, a division section 103, a low frequency band coding section 104, a high frequency band coding section 105, a multiplexing section 106, and an output terminal 107.

Frequency-domain conversion section 102 converts a time-domain digital signal input from input terminal 101 to the frequency domain, and generates a spectrum comprising a frequency-domain signal. The valid frequency band of this spectrum is assumed to be 0≤k<FH. Methods for performing conversion to the frequency domain include discrete Fourier transform, discrete cosine transform, modified discrete cosine transform, wavelet transform, and so forth.

Division section 103 divides the spectrum obtained by frequency-domain conversion section 102 into two frequency bands comprising a low frequency band spectrum and high frequency band spectrum, and sends the divided spectra to low frequency band coding section 104 and high frequency band coding section 105. Specifically, division section 103 divides the spectrum output from frequency-domain conversion section 102 into a low frequency band spectrum with a 0≤k<FL valid frequency band, and a high frequency band spectrum with an FL≤k<FH valid frequency band, and sends the obtained low frequency band spectrum to low frequency band coding section 104, and the high frequency band spectrum to high frequency band coding section 105.

Low frequency band coding section 104 performs coding of the low frequency band spectrum output from division section 103, and outputs the obtained coded information to multiplexing section 106. In the case of audio data or voice data, low frequency band data is more important than high frequency band data, and therefore more bits are distributed to low frequency band coding section 104, and higher-quality coding performed, than for high frequency band coding section 105. A method such as the MPEG Layer 3 method, AAC method, TwinVQ (Transform domain Weighted INterleave Vector Quantization) method, or the like is used as the actual coding method.

High frequency band coding section 105 performs coding processing described later herein on the high frequency band spectrum output from division section 103, and outputs the obtained coded information (gain information) to multiplexing section 106. A detailed description of the coding method used in high frequency band coding section 105 will be given later herein.

In multiplexing section 106, information relating to the low frequency band spectrum is input from low frequency band coding section 104, while gain information necessary for obtaining the outline of the high frequency band spectrum is input from high frequency band coding section 105. Multiplexing section 106 multiplexes these items of information and outputs them from output terminal 107.

Figure 6:
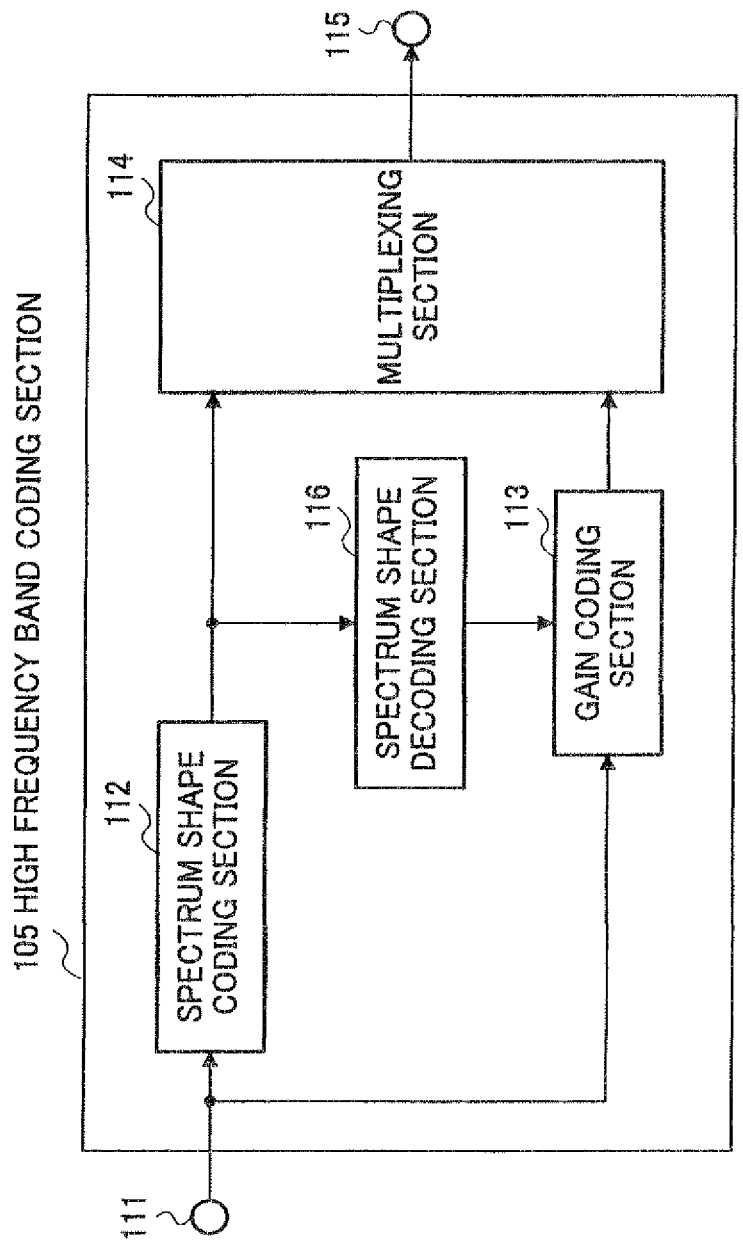
FIG. 6 is a block diagram showing the main internal configuration elements of a high frequency band coding section according to Embodiment 1.

FIG. 6 is a block diagram showing the main internal configuration elements of above-described high frequency band coding section 105.

A spectrum shape coding section 112 receives input signal spectrum S(k) with an FL≤k<FH valid frequency via an input terminal 111, and performs coding of the shape of this spectrum. Specifically, spectrum shape coding section 112 codes the spectrum shape so that auditory distortion becomes minimal, and sends coded information relating to this spectrum shape to a multiplexing section 114 and a spectrum shape decoding section 116.

As the spectrum shape coding method, for example, code vector C(i,k) when square distortion E expressed by Equation (1) is minimal is found, and this code vector C(i,k) is output.

$$E = \sum_{k=FL}^{FH-1} w(k) \cdot (S(k) - C(i,k))^2 \qquad \text{Equation (1)}$$

Here, C(i,k) represents the i'th code vector contained in the codebook, and w(k) represents a weighting factor corresponding to the auditory importance of frequency k. FL and FH represent indices corresponding to the minimum frequency and maximum frequency respectively of the high frequency band spectrum. Spectrum shape coding section 112 may also output a code vector C(i,k) that minimizes Equation (2).

$$E = \sum_{k=FL}^{FH-1} S(k)^2 - \frac{\left(\sum_{k=FL}^{FH-1} S(k) \cdot C(i,k)\right)^2}{\sum_{k=FL}^{FH-1} C(i,k)^2} \quad \text{Equation (2)}$$

As the first term on the right side of this equation is a constant term, a code vector that maximizes the second term on the right side may also be thought of as being output.

Spectrum shape decoding section 116 decodes coded information relating to the spectrum shape output from spectrum shape coding section 112, and sends obtained code vector C(i,k) to a gain coding section 113.

Gain coding section 113 codes the gain of code vector C(i,k) so that the outline of the spectrum of code vector C(i,k) approaches the outline of input spectrum S(k), the target signal, and sends coded information to multiplexing section 114. Gain coding section 113 processing will be described in detail later herein.

Multiplexing section 114 multiplexes the coded information output from spectrum shape coding section 112 and gain coding section 113, and outputs this information via an output terminal 115.

Figure 7:
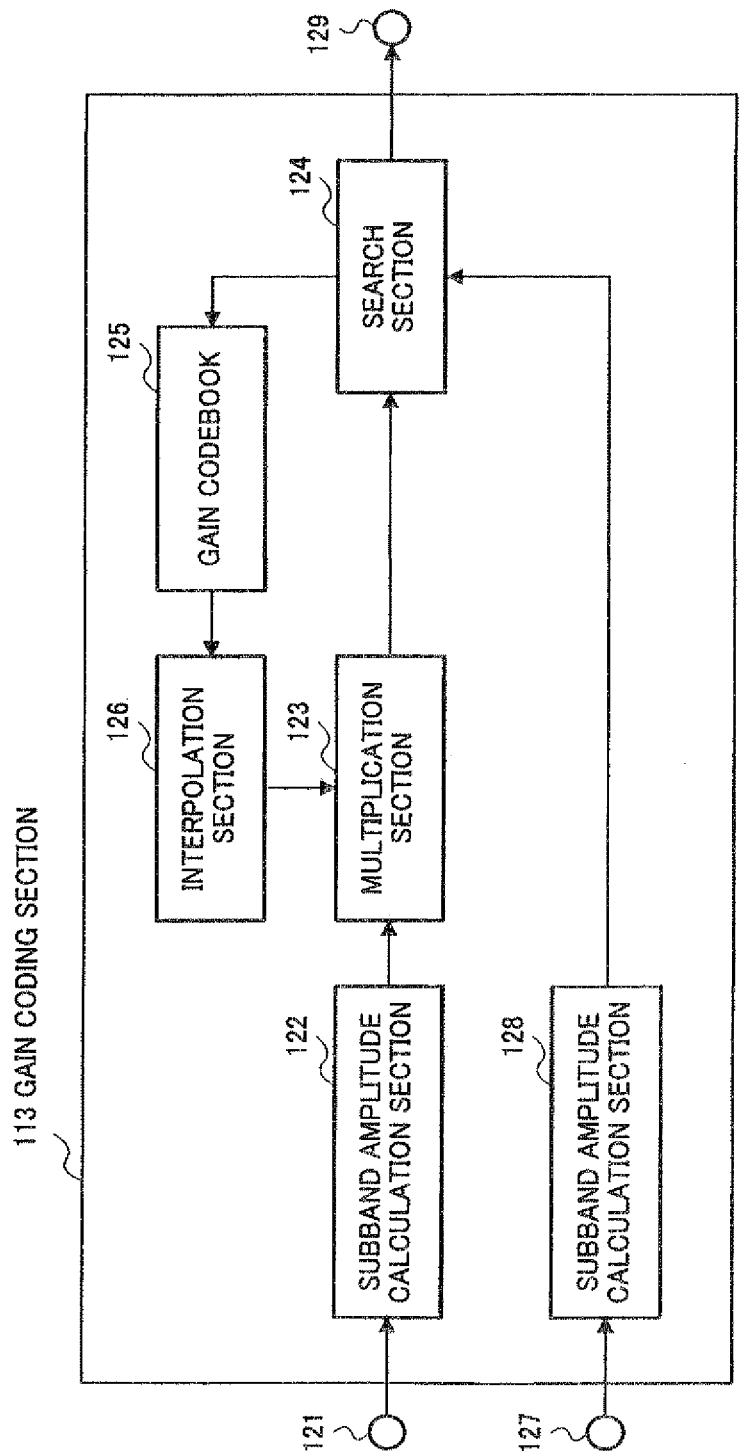
FIG. 7 is a block diagram showing the main internal configuration elements of a gain coding section according to Embodiment 1.

FIG. 7 is a block diagram showing the main internal configuration elements of above-described gain coding section 113. The shape of the high frequency band spectrum is input to gain coding section 113 from spectrum shape decoding section 116 via an input terminal 121, and the input spectrum is input via an input terminal 127.

A subband amplitude calculation section 122 calculates the amplitude value of each subband for the spectrum shape input from spectrum shape decoding section 116. A multiplication section 123 multiplies the amplitude value of each subband of the spectrum shape output from subband amplitude calculation section 122 by the gain of each subband (described later herein) output from an interpolation section 126 and adjusts the amplitude, and then outputs the result to a search section 124. Meanwhile, a subband amplitude calculation section 128 calculates the amplitude value of each subband for the input spectrum of the target signal input from input terminal 127, and outputs the result to search section 124.

Search section 124 calculates distortion between subband amplitude values output from multiplication section 123 and high frequency band spectrum subband amplitude values sent from subband amplitude calculation section 128. Specifically, a plurality of gain quantization value candidates g(j) are recorded beforehand in a gain codebook 125, and search section 124 specifies one of these gain quantization value candidates g(j), and calculates the above-described distortion (square distortion) for this candidate. Here, j is an index for identifying each gain quantization value candidate. Gain codebook 125 sends the gain candidate g(j) specified by search section 124 to interpolation section 126. Using this gain candidate g(j), interpolation section 126 calculates the gain value of a subband for which gain has not yet been determined, by means of an interpolation computation. Then interpolation section 126 sends the gain candidate provided by gain codebook 125 and the calculated interpolated gain candidate to multiplication section 123.

The processing of above-described multiplication section 123, search section 124, gain codebook 125, and interpolation section 126 forms a feedback loop, and search section 124 calculates the above-described distortion (square distortion) for all gain quantization value candidates g(j) recorded in gain codebook 125. Then search section 124 outputs index j of the gain for which square distortion is smallest via an output terminal 129. To describe the above processing in other words, search section 124 first selects a specific value from among gain quantization value candidates g(j) recorded in gain codebook 125, and generates a dummy high frequency band spectrum by interpolating the remaining gain quantization values using this value. Then this generated spectrum and the high frequency band spectrum of the target signal are compared and the similarity of the two spectra is determined, and search section 124 finally selects not the gain quantization value candidate used initially but the gain quantization value for which the similarity between the two spectra is the best, and outputs index j indicating this gain quantization value.

Figure 8A:
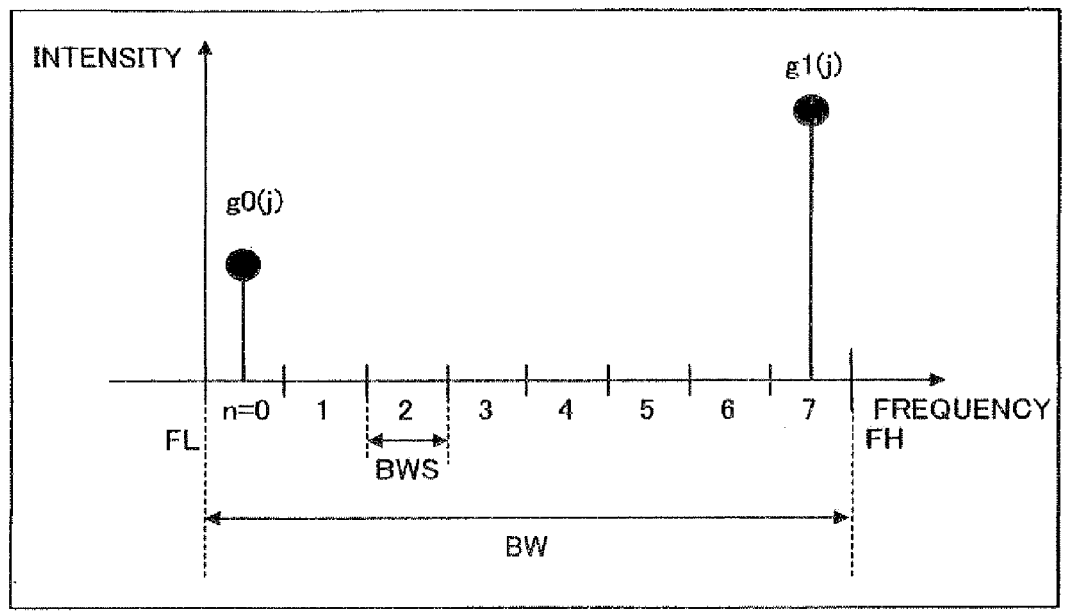
FIG. 8A is a graph for explaining a series of processes relating to interpolation computation according to Embodiment 1.
Figure 8B:
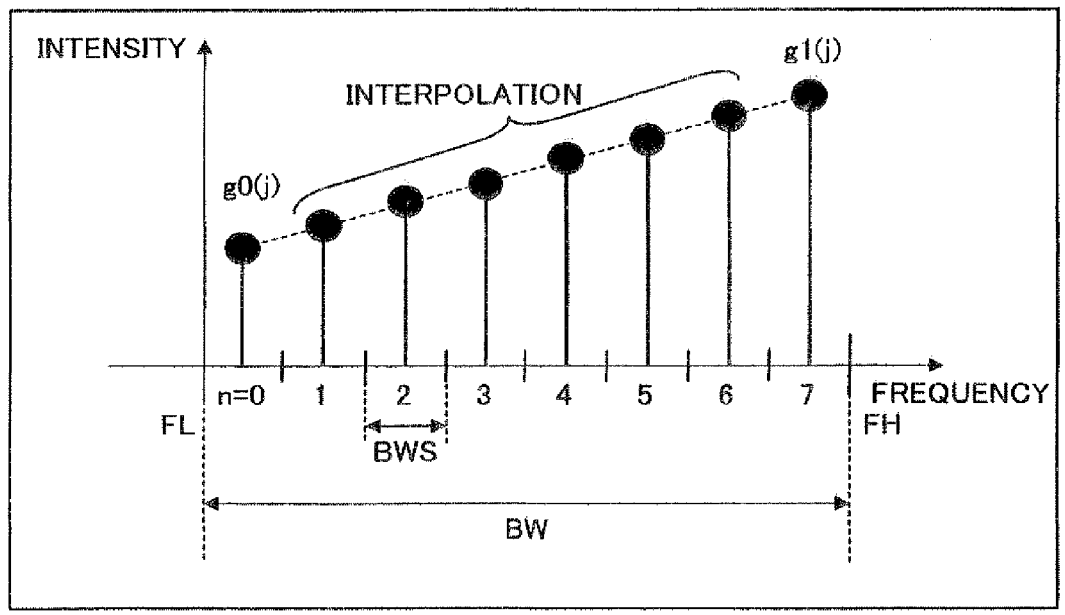
FIG. 8B is a graph for explaining a series of processes relating to interpolation computation according to Embodiment 1.

FIGS. 8A and 8B are graphs for explaining the above-described series of processes relating to interpolation computation in gain coding section 113. Here, as an example, a case will be described, in which the number of subbands N of the high frequency band spectrum is 8. Gain codebook 125 has gain candidates G(j)={g0(j), g1(j)}, having 0'th subband gain candidate g0(j) and 7th subband gain candidate g1(j) as elements. Here, j represents an index for identifying the gain candidate. Gain codebook 125 is designed beforehand using learning data of sufficient length, and therefore has suitable gain candidates stored in it.

Gain candidates G(j) may be scalar values or vector values, but will here be described as 2-dimensional vector values. Using gain candidates G(j), interpolation section 126 calculates gain for subbands whose gain has not yet been determined, by means of interpolation.

Specifically, interpolation processing is performed as shown in FIG. 8B. The 0'th subband gain is given by g0(j), and the 7th subband gain by g1(j), and the gain values of the other subbands are given as interpolated values by linear interpolation of g0(j) and g1(j).

Thus, according to a coding apparatus of this embodiment, an input wideband spectrum to be coded is divided into at least a low frequency band spectrum and a high frequency band spectrum, the high frequency band spectrum is further divided into a plurality of subbands, some subbands are selected from this plurality of subbands, and only the gain of the selected subbands is made subject to coding (quantization). Thus, since coding is not performed for all the subbands, gain can be coded efficiently with a small number of bits. The reason for executing the above-described processing on the high frequency band spectrum is that, when the input signal is an audio signal, voice signal, or the like, high frequency band data is of less importance than low frequency band data.

In the above configuration, a coding apparatus according to this embodiment represents the gains of non-selected subbands in the high frequency band spectrum by reciprocal interpolation of the selected gains. Thus, gain can be determined while smoothly approximating variations in the spectrum outline, with the number of bits maintained at a certain level. That is to say, the occurrence of degraded sounds can be suppressed, and quality is improved, with a small number of bits. Thus, when coding the spectrum of a wideband signal, the similarity between a high frequency band spectrum of the original signal and a newly generated spectrum can be improved while achieving a lowering of the bit rate.

The present invention focuses on the fact that the outline of a spectrum varies smoothly in the frequency axis direction, and making use of this property, limits points subject to coding (quantization points) to some thereof, codes only these quantization points, and finds the quantization point gain for other subbands by reciprocal interpolation.

In the above configuration, a transmitting apparatus equipped with a coding apparatus according to this embodiment transmits only the quantized gain of a selected subband, and does not transmit gain obtained by interpolation. On the other hand, a decoding apparatus provided in the receiving apparatus receives and decodes transmitted quantized gain, and reciprocally interpolates transmitted gain for non-transmitted subband gain. Use of these configurations lowers the transmission rate between transmitting and receiving apparatuses, enabling the communication system load to be reduced.

In this embodiment, a case in which linear interpolation of gain is performed has been described as an example, but the interpolation method is not limited to this, and if, for example, it is known that coding performance will be improved more by performing interpolation with a function other than a linear function, that function may be used for interpolation computations.

In this embodiment, a case in which the gains of subbands at the above-described locations are selected as quantization points—that is a case in which $g0(j)$ is the gain of the subband with the lowest frequency of the high frequency band spectrum, and $g1(j)$ is the gain of the subband with the highest frequency of the high frequency band spectrum—has been described as an example. While the locations of the quantization points are not necessarily limited to these settings, error due to interpolation can be expected to be reduced by meeting the following conditions. In particular, in order to maintain continuity between the low frequency band spectrum and high frequency band spectrum, it is desirable for the location of $g0(j)$ to be set close to frequency FL, the juncture between the low frequency band spectrum and high frequency band spectrum. However, even if the location of $g0(j)$ is set in this way, the low frequency band spectrum and the (newly generated) high frequency band spectrum will not necessarily be connected smoothly. Nevertheless, there will probably not be a major degradation of sound quality as long as continuity is at least maintained. Also, by setting $g1(j)$ at the location of the subband with the highest frequency of the high frequency band spectrum (in short, at the right end of the high frequency band spectrum), as long as the gain of this location at least can be specified, generally speaking it will probably be possible to represent the outline of the entire high frequency band spectrum efficiently, although perhaps with rough precision. However, the location of $g1(j)$ may also be intermediate between FL and FH, for example.

In this embodiment, a case in which there are two quantization points, $g0(j)$ and $g1(j)$, has been described as an example, but there may also be a single quantization point. This case will be described in detail below, using the accompanying drawings.

Figure 9:
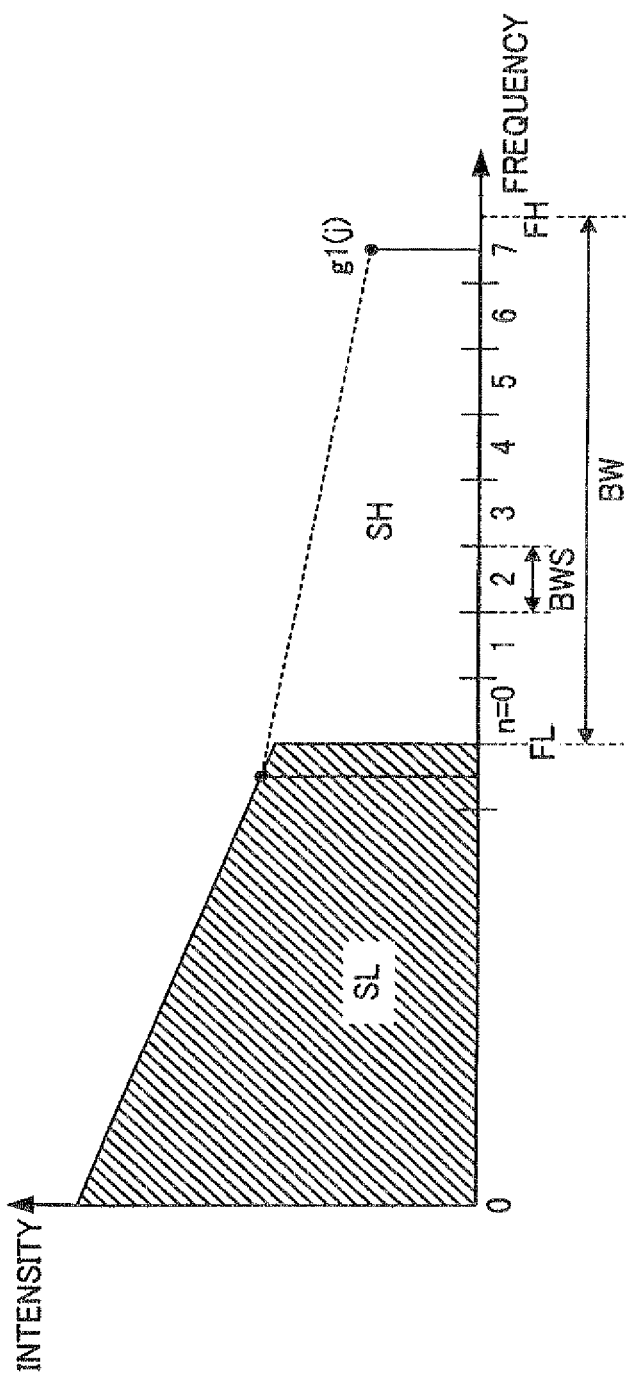
FIG. 9 is a graph showing a case in which there is only one quantization point, $g1(j)$.

FIG. 9 is a graph showing a case in which there is only one quantization point, $g1(j)$. In this figure, SL indicates the low frequency band spectrum and SH indicates the high frequency band spectrum. As the gain value of the highest-frequency subband of the low frequency band spectrum can be expected not to differ greatly from the gain value of the lowest-frequency subband of the high frequency band spectrum in this way, the gain value of the highest-frequency subband of the low frequency band spectrum is used instead of $g0(j)$. This makes it possible to perform the above-described interpolation without finding $g0(j)$.

Figure 10A:
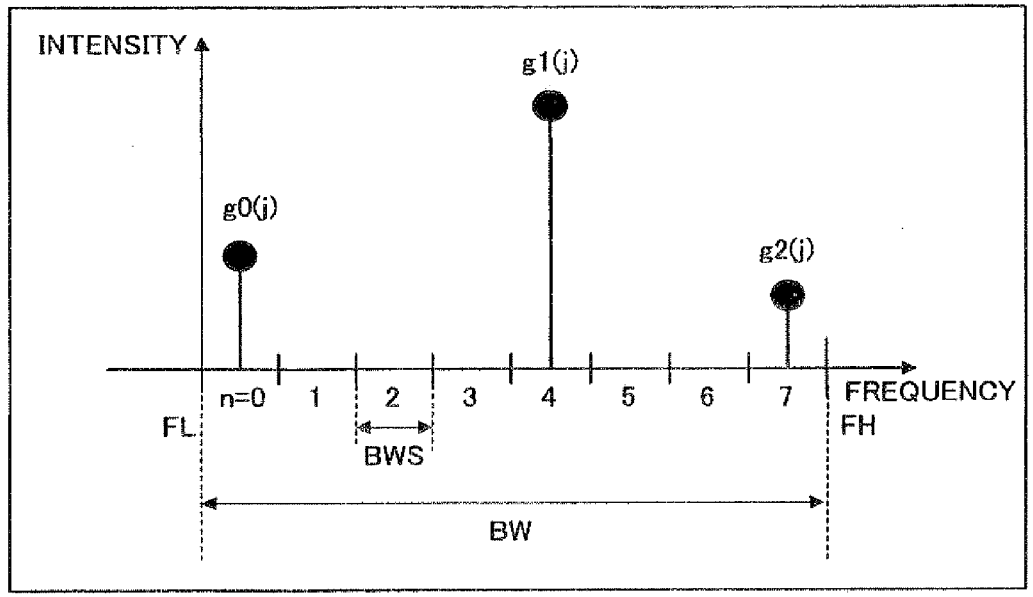
FIG. 10A is a graph showing a case in which there are three quantization points.
Figure 10B:
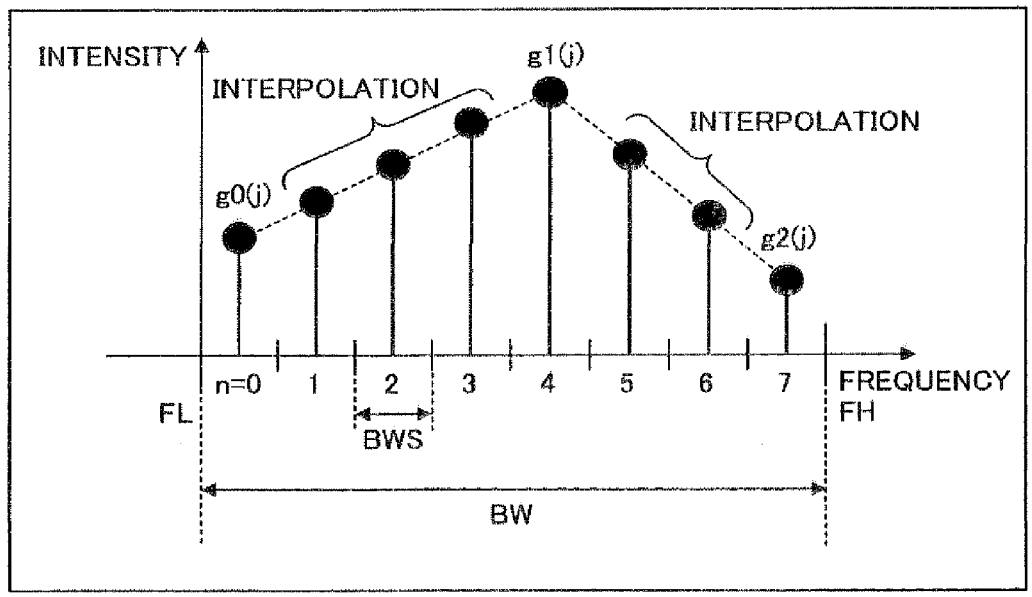
FIG. 10B is a graph showing a case in which there are three quantization points.

Three or more quantization points may also be used. FIGS. 10A and 10B are graphs showing a case in which there are three quantization points.

As shown in these figures, subband gains determined in three subbands are used, and the gains of other subbands are determined by interpolation. By using three or more quantization points in this way, even if two points are used to represent gain at the ends of the high frequency band spectrum (FL and FH), at least one point can be located in the middle of the high frequency band spectrum (the part other than the ends). Therefore, even if there is a distinctive part in the outline of the high frequency band spectrum, such as a peak (maximum point) or a dip (minimum point), by assigning one quantization point to this peak or dip it is possible to generate coding parameters that represent the high frequency band spectrum outline with good precision. However, although small variations in the spectrum outline can be coded more faithfully if the number of quantization points is increased to three or more, coding efficiency falls as a trade-off.

In this embodiment, a case has been described by way of example in which the coding method comprises a step of selecting some quantization points from a plurality of subbands, and a step of obtaining the remaining gain values by means of interpolation computations, but since a lower bit rate can be achieved simply by limiting quantization points to a fraction of the total, if high coding performance is not required the interpolation computation step may be omitted, and only the step of selecting some quantization points performed.

In this embodiment, a case in which subbands are generated by dividing the band at equal intervals has been described as an example, but this is not a limitation, and a nonlinear division method using a Bark scale, for example, may also be used.

In this embodiment, a case in which an input digital signal is converted directly to the frequency domain before performing band division has been described as an example, but this is not a limitation.

Figure 11:
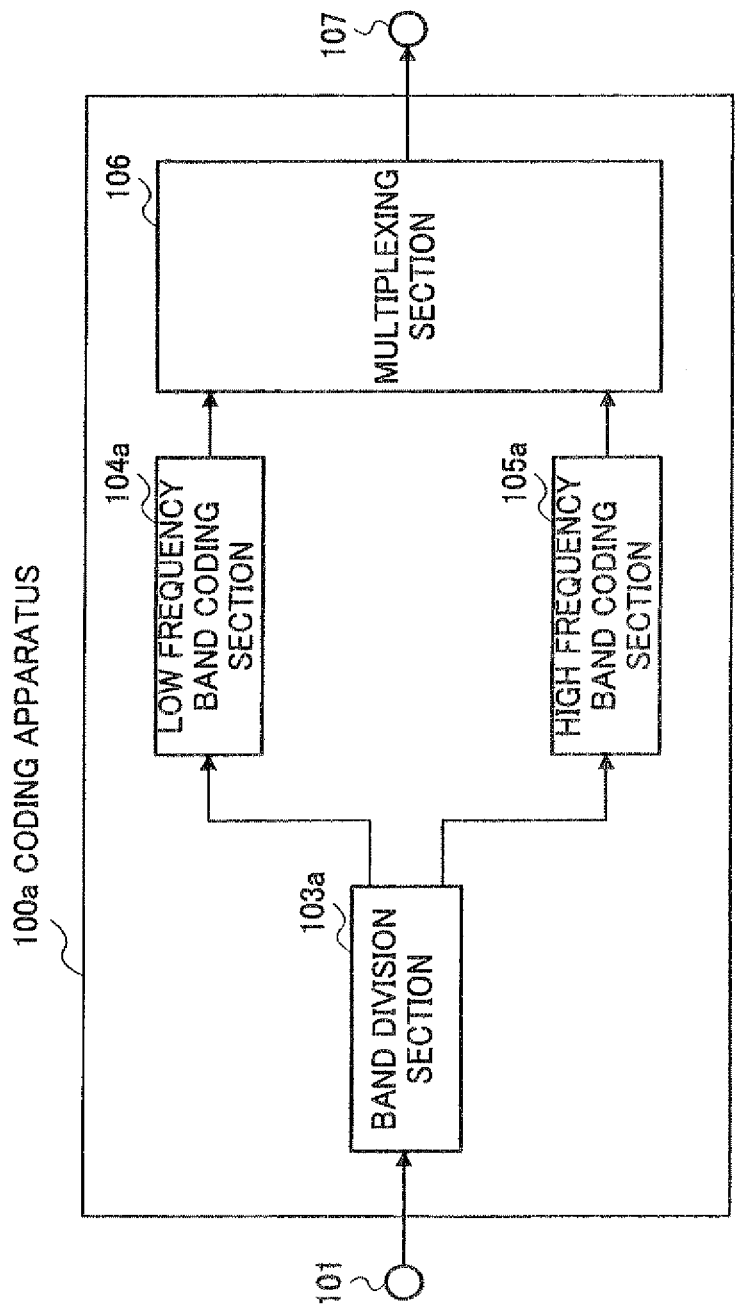
FIG. 11 is a block diagram showing another variation of a coding apparatus according to Embodiment 1.

FIG. 11 is a block diagram showing another variation of above-described coding apparatus 100 (coding apparatus 100a). Identical configuration elements are assigned the same codes.

As shown in this figure, a configuration may also be employed whereby band division is performed by executing filter processing on an input digital signal. In this case, band division is performed using a polyphase filter, quadrature mirror filter, or the like.

Figure 12:
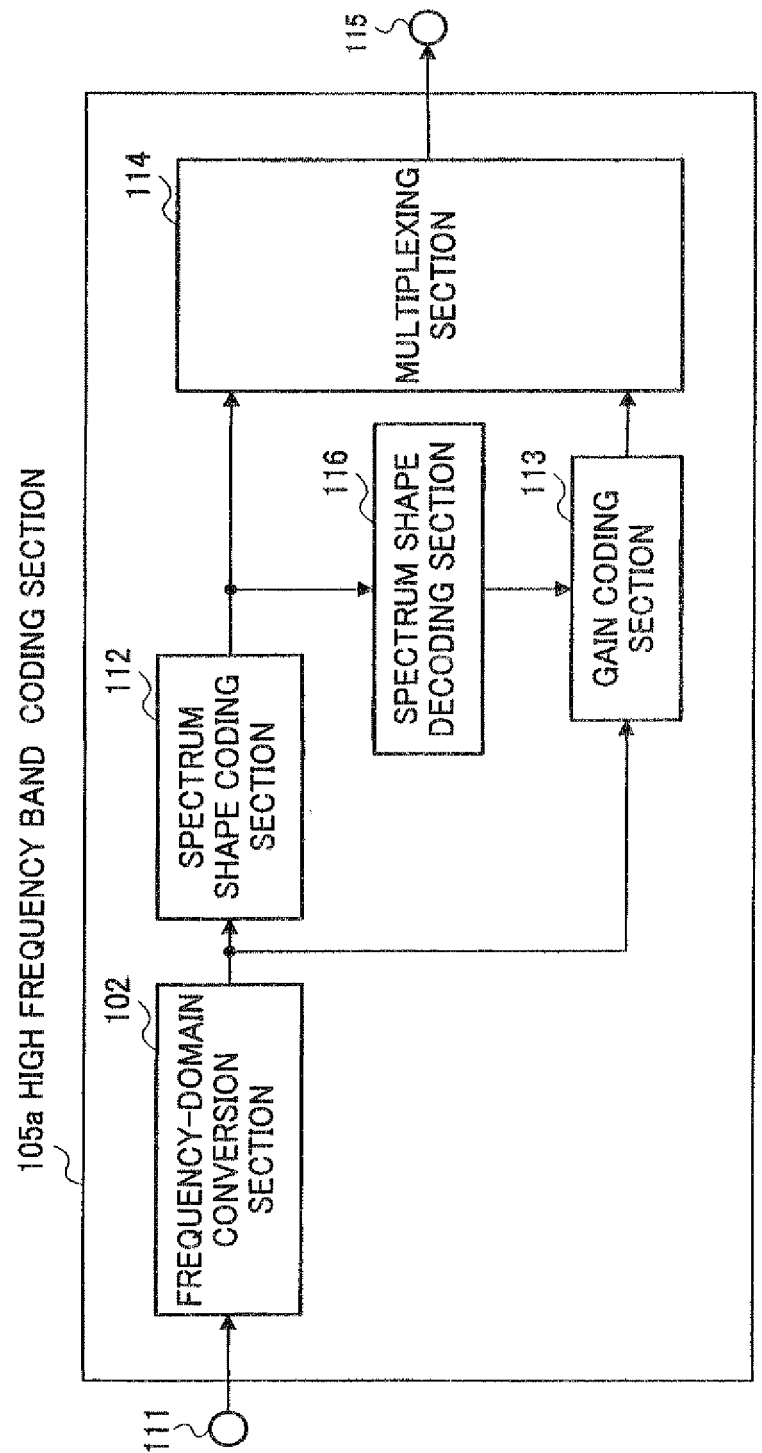
FIG. 12 is a block diagram showing the main configuration elements of a high frequency band coding section according to Embodiment 1.

FIG. 12 is a block diagram showing the main configuration elements of a high frequency band coding section 105a in coding apparatus 100a. Configuration elements identical to those in high frequency band coding section 105 are assigned the same codes. The difference between high frequency band coding section 105 and high frequency band coding section 105a is the location of the frequency-domain conversion section.

The coding-side configuration has been described in detail above. Next, the decoding-side configuration will be described in detail.

Figure 13:
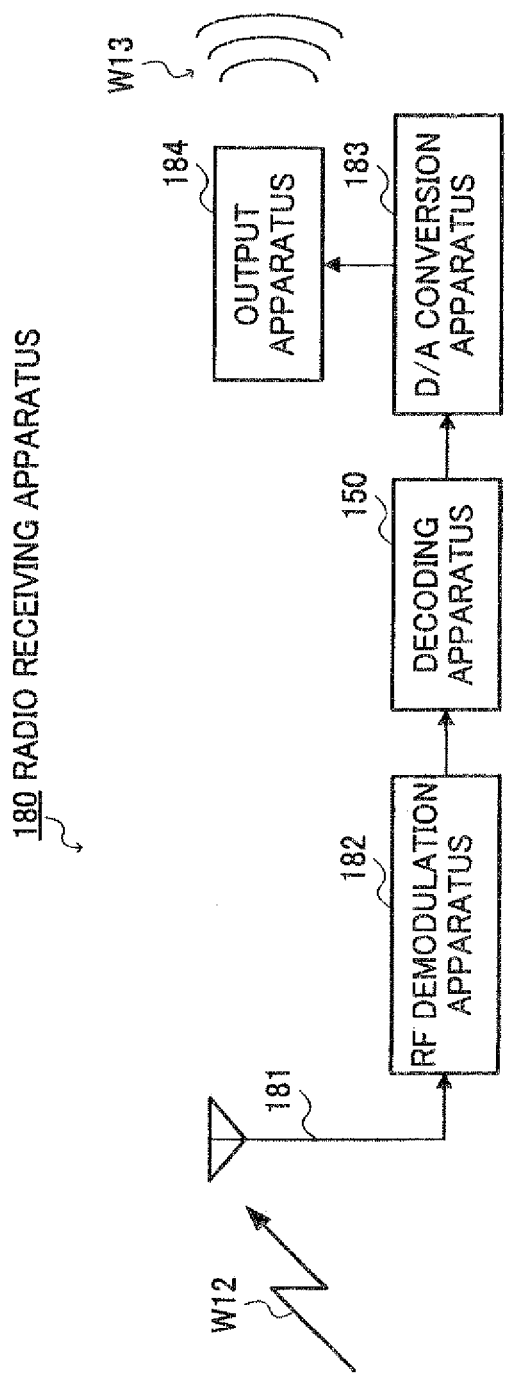
FIG. 13 is a block diagram showing the main configuration elements of a radio receiving apparatus according to Embodiment 1.

FIG. 13 is a block diagram showing the main configuration elements of a radio receiving apparatus 180 that receives a signal transmitted from radio transmitting apparatus 130 according to this embodiment.

Radio receiving apparatus 180 has an antenna 181, an RF demodulation apparatus 182, a decoding apparatus 150, a D/A conversion apparatus 183, and an output apparatus 184.

Antenna 181 receives a digital coded sound signal as radio wave W12 and generates an electrical signal that is a digital received coded sound signal, and sends this signal to RF demodulation apparatus 182. RF demodulation apparatus 182 demodulates the received coded sound signal from antenna 181 and generates a demodulated coded sound signal, and sends this signal to decoding apparatus 150.

Decoding apparatus 150 receives the digital demodulated coded sound signal from RF demodulation apparatus 182, performs decoding processing and generates a digital decoded sound signal, and sends this signal to D/A conversion apparatus 183. D/A conversion apparatus 183 converts the digital decoded voice signal from decoding apparatus 150 and generates an analog decoded voice signal, and sends this signal to output apparatus 184. Output apparatus 184 converts the electrical analog decoded voice signal to air vibrations and outputs these vibrations as a sound wave W13 audible to the human ear.

Figure 14:
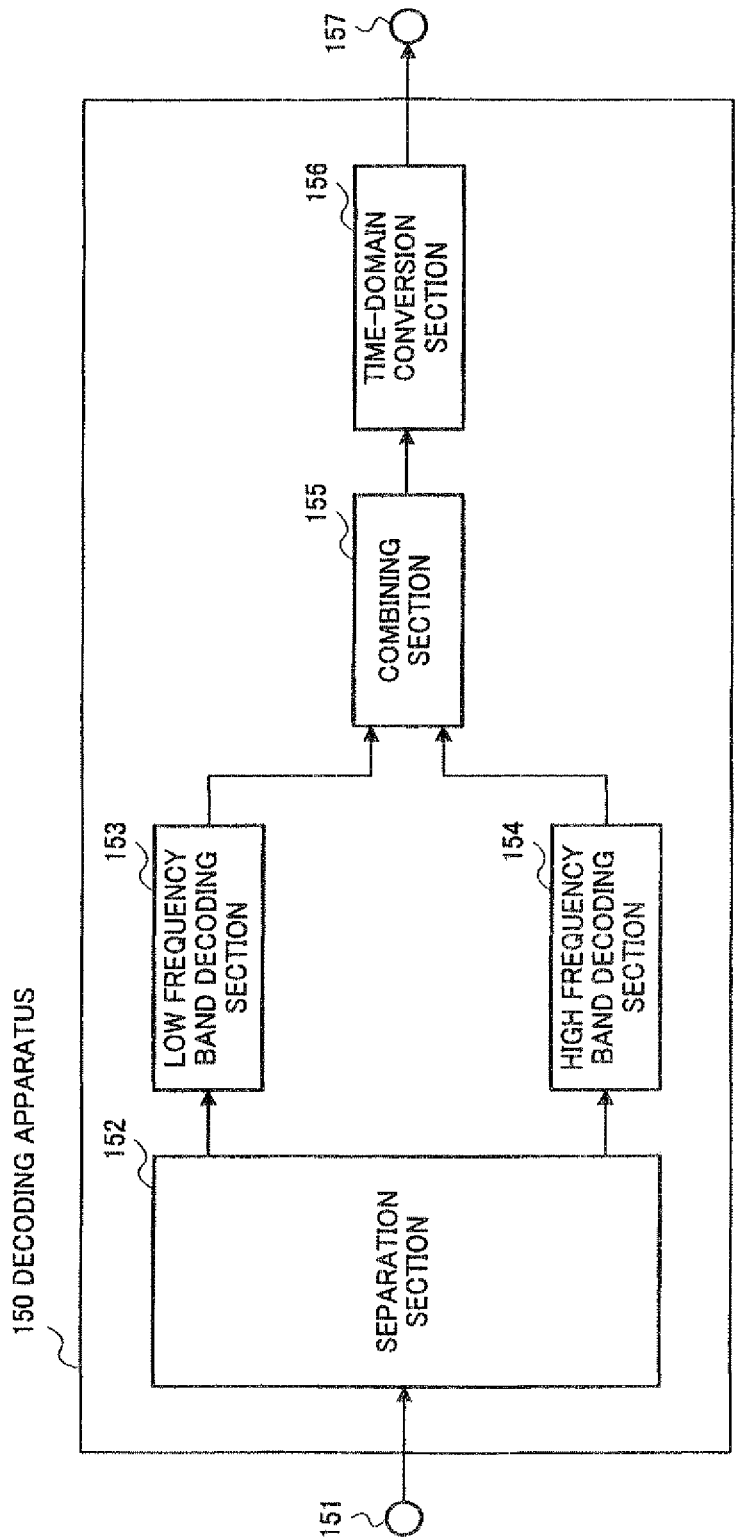
FIG. 14 is a block diagram showing the main internal configuration elements of a decoding apparatus according to Embodiment 1.

FIG. 14 is a block diagram showing the main internal configuration elements of above-described decoding apparatus 150.

A separation section 152 separates low frequency band coding parameters and high frequency band coding parameters from a demodulated decoded sound signal input via an input terminal 151, and sends these coding parameters to a low frequency band decoding section 153 and a high frequency band decoding section 154 respectively. Low frequency band decoding section 153 decodes the coding parameters obtained by coding processing of low frequency band coding section 104 and generates a low frequency band decoded spectrum, and sends this to a combining section 155. High frequency band decoding section 154 performs decoding processing using the high frequency band coding parameters, generates a high frequency band decoded spectrum, and sends this to combining section 155. Details of high frequency band decoding section 154 will be given later herein. Combining section 155 combines the low frequency band decoded spectrum and high frequency band decoded spectrum, and sends the combined spectrum to a time-domain conversion section 156. Time-domain conversion section 156 converts the combined spectrum to the time domain, and also performs processing such as windowing and overlapped addition to deter the occurrence of discontinuities between consecutive frames, and outputs the result from an output terminal 157.

Figure 15:
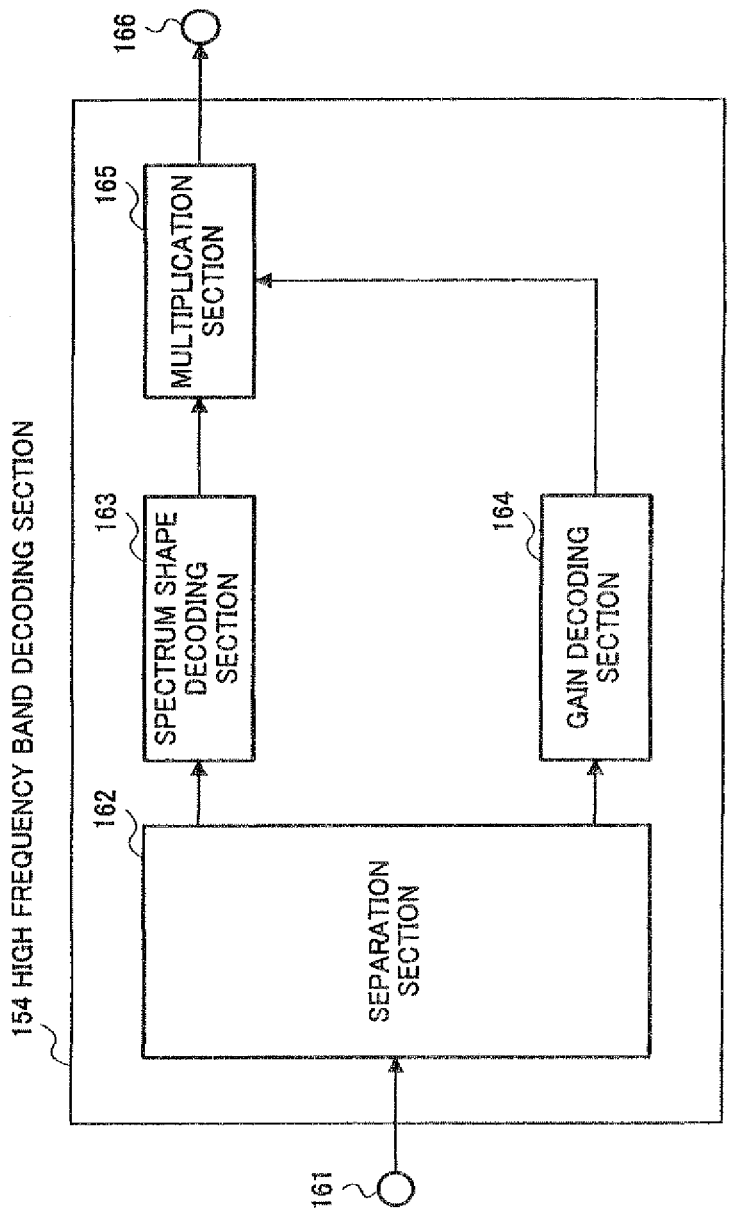
FIG. 15 is a block diagram showing the main internal configuration elements of a high frequency band decoding section according to Embodiment 1.

FIG. 15 is a block diagram showing the main internal configuration elements of high frequency band decoding section 154.

A separation section 162 separates a spectrum shape code and gain code from high frequency band coding parameters input via an input terminal 161, and sends these to a spectrum shape decoding section 163 and a gain decoding section 164 respectively. Spectrum shape decoding section 163 references the spectrum shape code and selects code vector C(i,k) from the codebook, and sends this to a multiplication section 165. Gain decoding section 164 decodes gain based on the gain code, and sends this to multiplication section 165. Details of this gain decoding section 164 will be given in Embodiment 2. Multiplication section 165 multiplies the code vector C(i,k) selected by spectrum shape decoding section 163 by the gain decoded by gain decoding section 164, and outputs the result via an output terminal 166.

Figure 16:
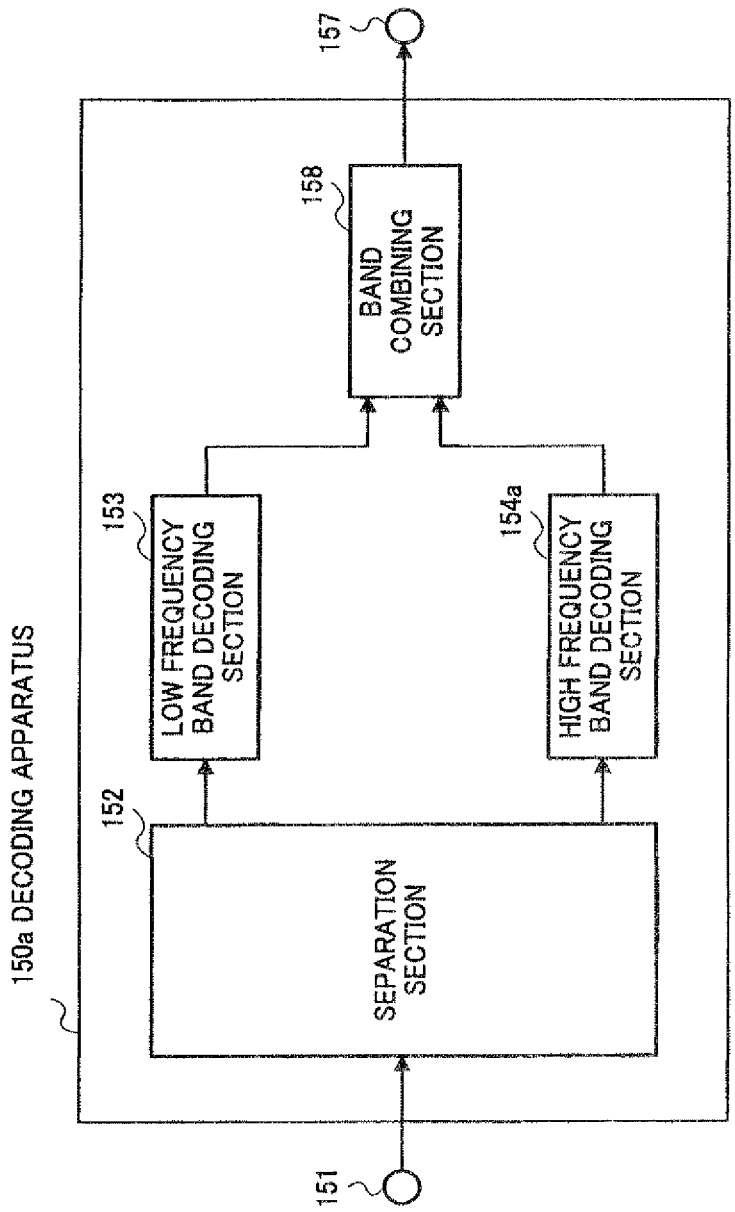
FIG. 16 is a drawing showing the configuration of a decoding apparatus according to Embodiment 1.
Figure 17:
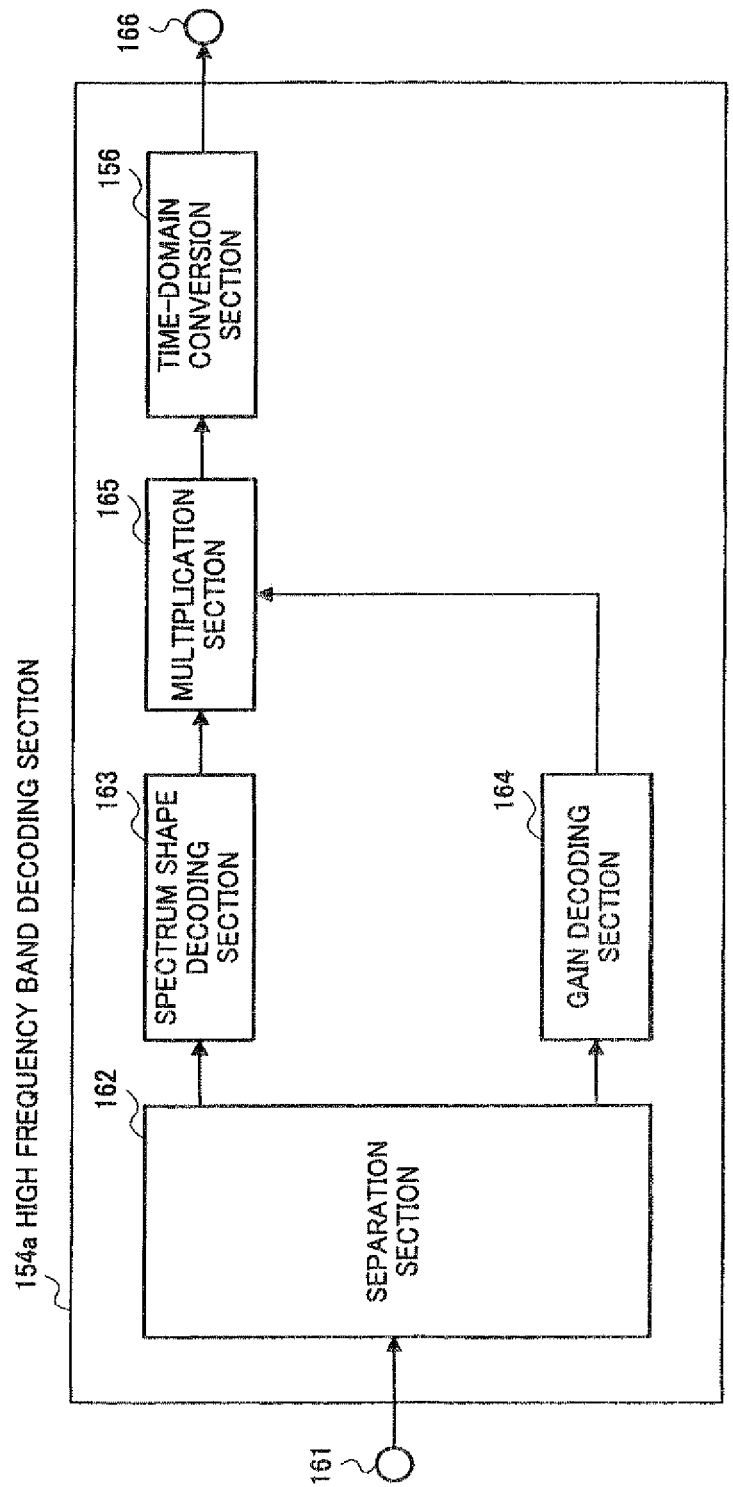
FIG. 17 is a block diagram showing the main configuration elements of a high frequency band decoding section according to Embodiment 1.

When the coding-side configuration is such as to perform band division into a low frequency band signal and high frequency band signal by means of a band division filter, as in the case of coding apparatus 100a shown in FIG. 11, the configuration of a corresponding decoding apparatus is as shown in FIG. 16 (decoding apparatus 150a). Identical configuration elements are assigned the same codes. FIG. 17 is a block diagram showing the main configuration elements of a high frequency band decoding section 154a in decoding apparatus 150a. The difference between high frequency band decoding section 154 and high frequency band decoding section 154a is the location of the time-domain conversion section.

Thus, according to the above-described decoding apparatus, information coded by a coding apparatus according to this embodiment can be decoded.

In this embodiment, a case in which the frequency band of an input signal is divided into two bands has been described as an example, but this is not a limitation, and it is possible to perform division into two or more bands and perform the previously described spectrum coding processing on one or a plurality thereof.

In this embodiment, a case in which a time-domain signal is input has been described as an example, but a frequency-domain signal may also be input directly.

A case in which a coding apparatus or decoding apparatus according to this embodiment is applied to a radio communication system has been described here as an example, but a coding apparatus or decoding apparatus according to this embodiment can also be applied to a cable communication system as described below.

Figure 18A:
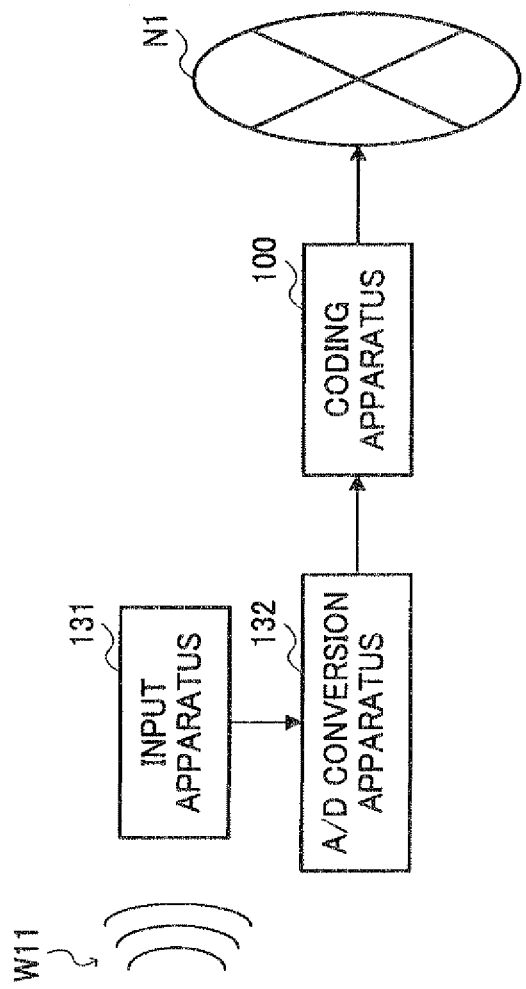
FIG. 18A is a block diagram showing the main configuration elements on the transmitting side when a coding apparatus according to Embodiment 1 is applied to a cable communication system.

FIG. 18A is a block diagram showing the main configuration elements on the transmitting side when a coding apparatus according to this embodiment is applied to a cable communication system. Configuration elements identical to those already shown in FIG. 4 are assigned the same codes as in FIG. 4, and descriptions thereof are omitted.

A cable transmitting apparatus 140 has a coding apparatus 100, input apparatus 131, and A/D conversion apparatus 132, and its output is connected to a network N1.

The input terminal of A/D conversion apparatus 132 is connected to the output terminal of input apparatus 131. The input terminal of coding apparatus 100 is connected to the output terminal of A/D conversion apparatus 132. The output terminal of coding apparatus 100 is connected to network N1.

Input apparatus 131 converts sound wave W11 audible to the human ear to an analog signal that is an electrical signal, and sends this signal to A/D conversion apparatus 132. A/D conversion apparatus 132 converts this analog signal to a digital signal, and sends this signal to coding apparatus 100. Coding apparatus 100 codes the input digital signal and generates code, and outputs this to network N1.

Figure 18B:
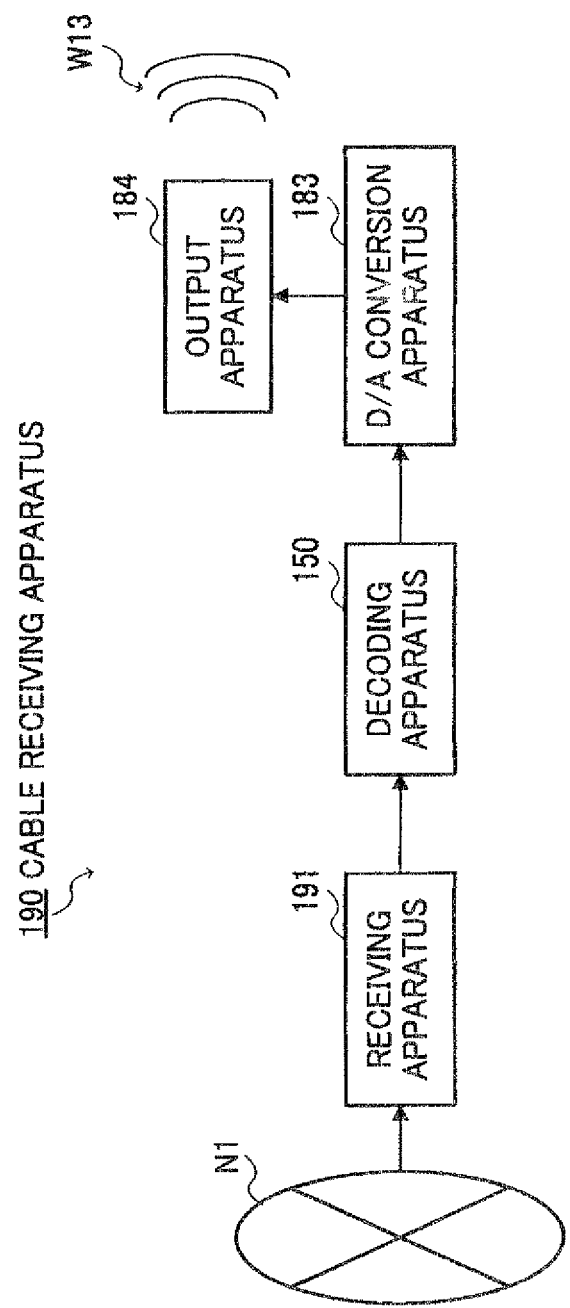
FIG. 18B is a block diagram showing the main configuration elements on the receiving side when a decoding apparatus according to Embodiment 1 is applied to a cable communication system.

FIG. 18B is a block diagram showing the main configuration elements on the receiving side when a decoding apparatus according to this embodiment is applied to a cable communication system. Configuration elements identical to those already shown in FIG. 13 are assigned the same codes as in FIG. 13, and descriptions thereof are omitted.

A cable receiving apparatus 190 has a receiving apparatus 191 connected to network N1, and a decoding apparatus 150, D/A conversion apparatus 183, and output apparatus 184.

The input terminal of receiving apparatus 191 is connected to network N1. The input terminal of decoding apparatus 150 is connected to the output terminal of receiving apparatus 191. The input terminal of D/A conversion apparatus 183 is connected to the output terminal of decoding apparatus 150. The input terminal of output apparatus 184 is connected to the output terminal of D/A conversion apparatus 183.

Receiving apparatus 191 receives a digital coded sound signal from network N1 and generates a digital received sound signal, and sends this signal to decoding apparatus 150. Decoding apparatus 150 receives the received sound signal from receiving apparatus 191, performs decoding processing on this received sound signal and generates a digital decoded sound signal, and sends this signal to D/A conversion apparatus 183. D/A conversion apparatus 183 converts the digital decoded voice signal from decoding apparatus 150 and generates an analog decoded voice signal, and sends this signal to output apparatus 184. Output apparatus 184 converts the electrical analog decoded sound signal to air vibrations and outputs these vibrations as sound wave W13 audible to the human ear.

Thus, according to the above-described configurations, cable transmitting and receiving apparatuses can be provided that have the same kind of operational effects as the above-described radio transmitting and receiving apparatuses.

Embodiment 2

A characteristic of this embodiment is that a coding apparatus and decoding apparatus of the present invention are applied to scalable band coding having scalability in the frequency axis direction.

Figure 19:
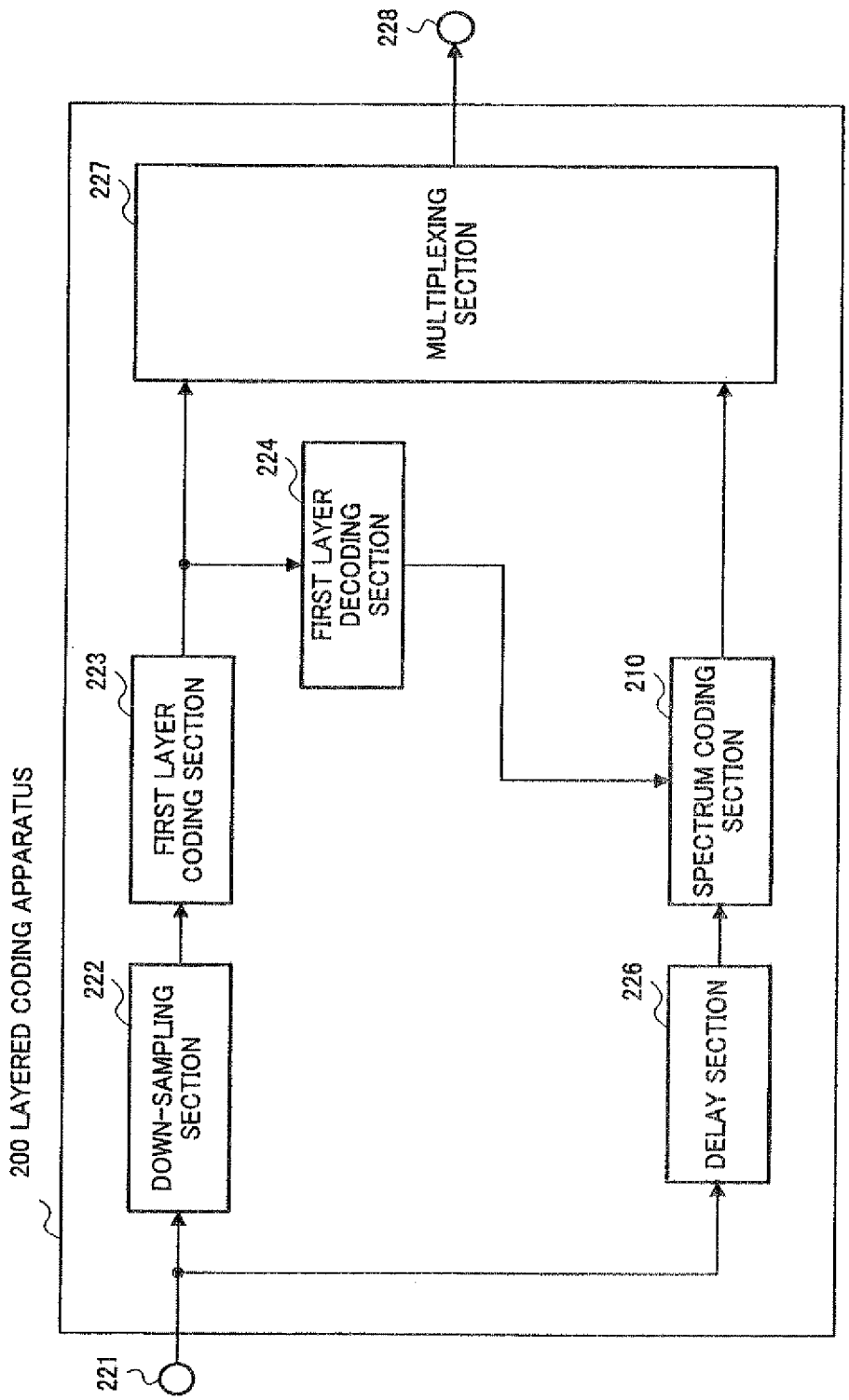
FIG. 19 is a block diagram showing the main configuration elements of a layered coding apparatus according to Embodiment 2.

FIG. 19 is a block diagram showing the main configuration elements of a layered coding apparatus 200 according to Embodiment 2 of the present invention.

Layered coding apparatus 200 has an input terminal 221, a down-sampling section 222, a first layer coding section 223, a first layer decoding section 224, a delay section 226, a spectrum coding section 210, a multiplexing section 227, and an output terminal 228.

A signal with a 0≤k<FH valid frequency band is input to input terminal 221 from A/D conversion apparatus 132. Down-sampling section 222 executes down-sampling on the signal input via input terminal 221, and generates and outputs a low-sampling-rate signal. First layer coding section 223 codes the down-sampled signal and outputs the obtained coding parameter to multiplexing section (multiplexer) 227 and also to first layer decoding section 224. First layer decoding section 224 generates a first layer decoded signal based on this coding parameter.

Meanwhile, delay section 226 imparts a delay of predetermined length to the signal input via input terminal 221. The length of this delay is equal to the time lag when first layer coding section 223 and first layer decoding section 224 are passed through. Spectrum coding section 210 performs spectrum coding with the signal output from first layer decoding section 224 as a first signal and the signal output from delay section 226 as a second signal, and outputs the generated coding parameter to multiplexing section 227. Multiplexing section 227 multiplexes the coding parameter obtained by first layer coding section 223 and the coding parameter obtained by spectrum coding section 210, and outputs the result as output code via output terminal 228. This output code is sent to RF modulation apparatus 133.

Figure 20:
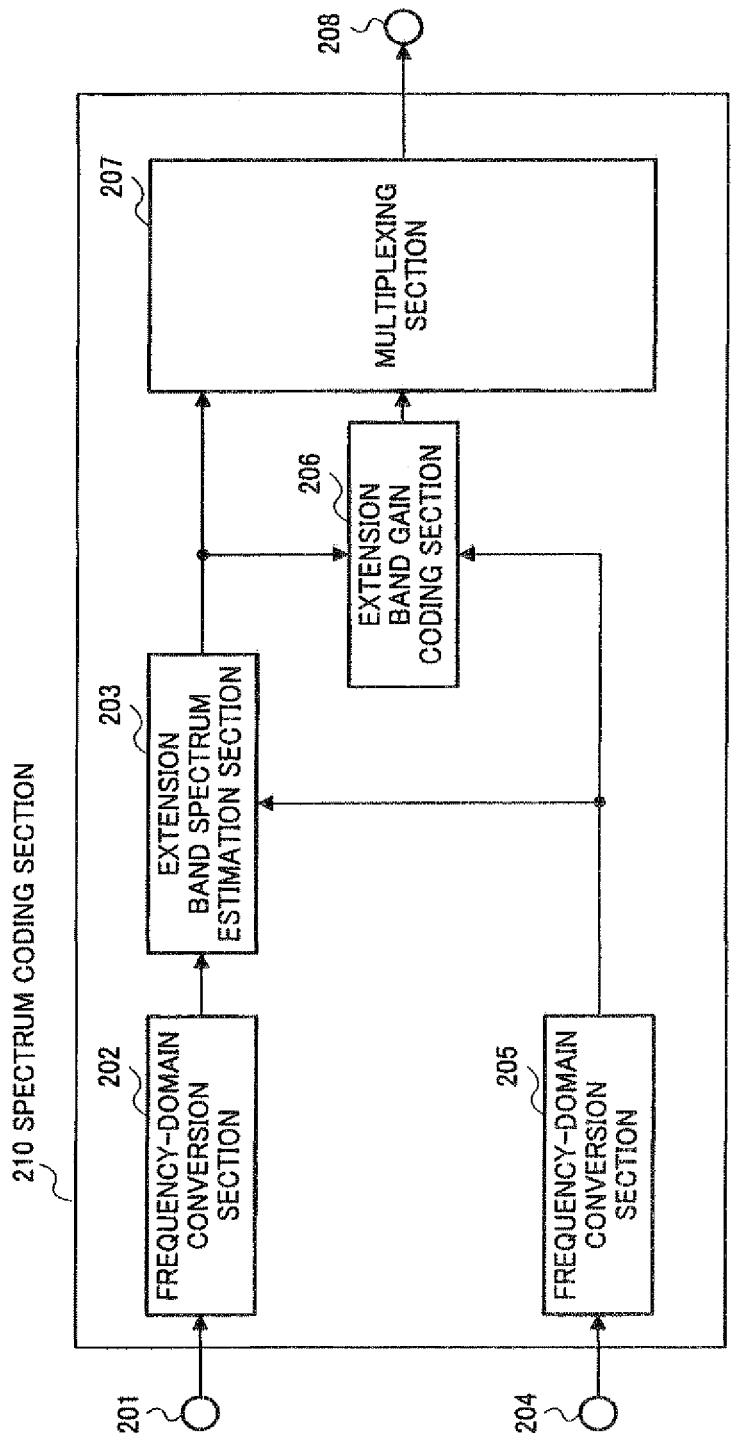
FIG. 20 is a block diagram showing the main internal configuration elements of a spectrum coding section according to Embodiment 2.

FIG. 20 is a block diagram showing the main internal configuration elements of above-described spectrum coding section 210.

Spectrum coding section 210 has input terminals 201 and 204, frequency-domain conversion sections 202 and 205, an extension band spectrum estimation section 203, an extension band gain coding section 206, a multiplexing section 207, and an output terminal 208.

The signal decoded by first layer decoding section 224 is input to input terminal 201. The valid frequency band of this signal is 0≤k<FL. The second signal with an valid frequency band of 0≤k<FH (where FL<FH) is input to input terminal 204 from delay section 226.

Frequency-domain conversion section 202 performs frequency conversion on the first signal input from input terminal 201, and calculates a first spectrum S1(k). Frequency-domain conversion section 205 performs frequency conversion on the second signal input from input terminal 204, and calculates a second spectrum S2(k). The frequency conversion method used here is discrete Fourier transform (DFT), discrete cosine transform (DCT), modified discrete cosine transform (MDCT), or the like.

Extension band spectrum estimation section 203 estimates the spectrum that should be included in band FL≤k<FH of first spectrum S1(k) with second spectrum S2(k) as a reference signal, and finds estimated spectrum E(k) (where FL≤k<FH). Here, estimated spectrum E(k) is estimated based on a spectrum included in the low frequency band (0≤k<FL) of first spectrum S1(k).

Extension band gain coding section 206 codes the gain by which estimated spectrum E(k) should be multiplied using estimated spectrum E(k) and second spectrum S2(k). In the processing here, it is particularly important that the spectrum outline of estimated spectrum E(k) in the extension band be made to approximate the spectrum outline of second spectrum S2(k) efficiently and with a small number of bits. Whether or not this is achieved greatly affects the sound quality.

Information relating to the estimated spectrum of the extension band is input to multiplexing section 207 from extension band spectrum estimation section 203, and gain information necessary for obtaining the spectrum outline of the extension band is input to multiplexing section 207 from extension band gain coding section 206. These items of information are multiplexed and then output from output terminal 208.

Figure 21:
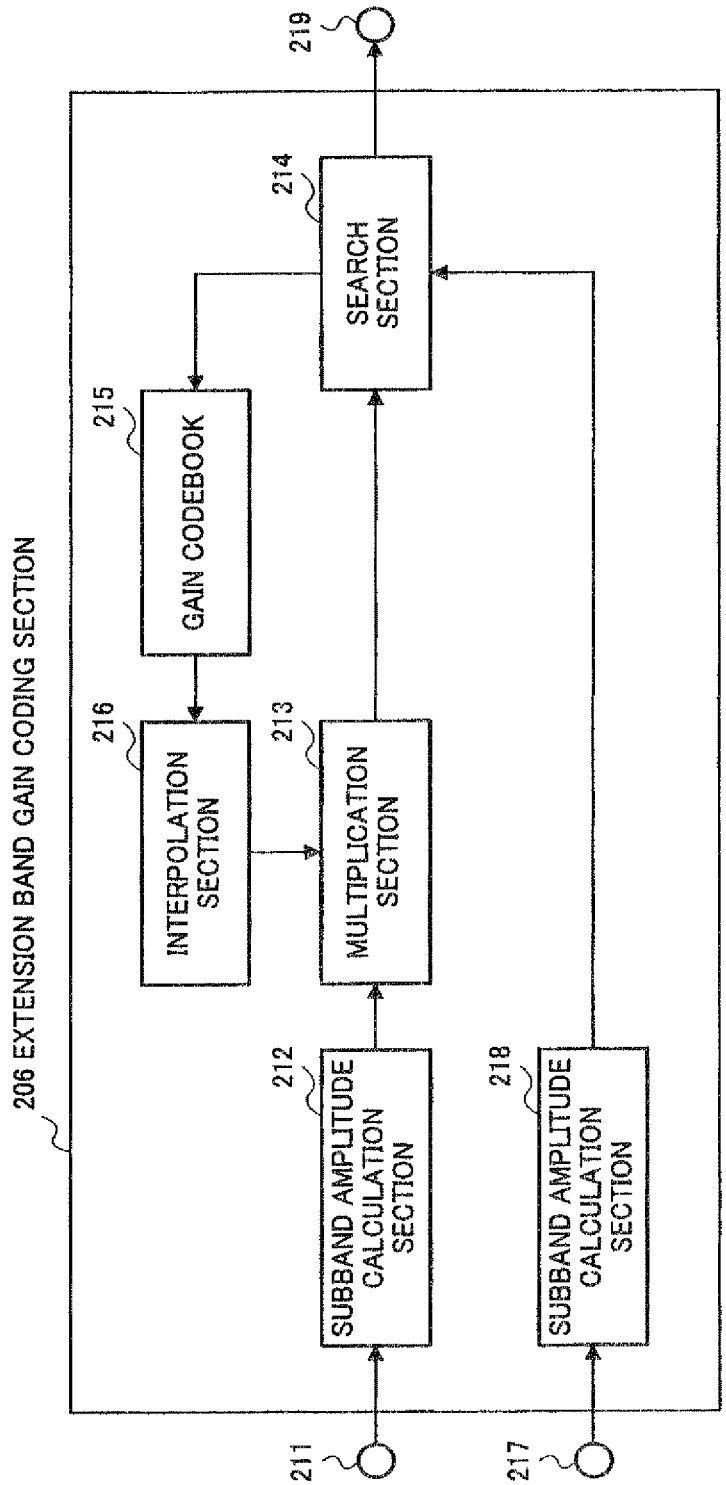
FIG. 21 is a block diagram showing the main internal configuration elements of an extension band gain coding section according to Embodiment 2.

FIG. 21 is a block diagram showing the main internal configuration elements of above-described extension band gain coding section 206.

This extension band gain coding section 206 has input terminals 211 and 217, subband amplitude calculation sections 212 and 218, a gain codebook 215, an interpolation section 216, a multiplication section 213, a search section 214, and an output terminal 219.

Estimated spectrum E(k) is input from input terminal 211, and second spectrum S2(k) is input from input terminal 217. Subband amplitude calculation section 212 divides the extension band into subbands, and calculates the amplitude value of estimated spectrum E(k) for each subband. When the extension band is expressed as FL≤k<FH, bandwidth BW of the extension band is expressed by Equation (3).

$$BW = FH - FL + 1 \qquad \text{Equation (3)}$$

When this extension band is divided into N subbands, bandwidth BW of each subband is expressed by Equation (4).

$$BWS = (FH - FL + 1)/N \qquad \text{Equation (4)}$$

Thus, minimum frequency FL(n) of the nth subband is expressed by Equation (5), and maximum frequency FH(n) is expressed by Equation (6).

$$FL(n) = FL + n \cdot BWS \qquad \text{Equation (5)}$$

$$FH(n) = FL + (n+1) \cdot BWS - 1 \qquad \text{Equation (6)}$$

Amplitude value AE(n) of estimated spectrum E(k) stipulated in this way is calculated in accordance with Equation (7).

$$AE(n) = \sqrt{\frac{\sum_{k=FL(n)}^{FH(n)} E(k)^2}{BWS}} \qquad \text{Equation (7)}$$

Similarly, subband amplitude calculation section 218 calculates amplitude value AS2(n) of each subband of second spectrum S2(k) in accordance with Equation (8).

$$AS2(n) = \sqrt{\frac{\sum_{k=FL(n)}^{FH(n)} S2(k)^2}{BWS}} \qquad \text{Equation (8)}$$

Meanwhile, gain codebook 215 has J gain quantization value candidates G(j) (where 0≤j<J), and executes the following processing for all gain candidates. Gain candidates G(j) may be scalar values or vector values, but for purposes of explanation will here be assumed to be 2-dimensional vector values (that is, g(j)={g0(j), g1(j)}). Gain codebook 215 is designed beforehand using learning data of sufficient length, and therefore has suitable gain candidates stored in it.

Figure 22A:
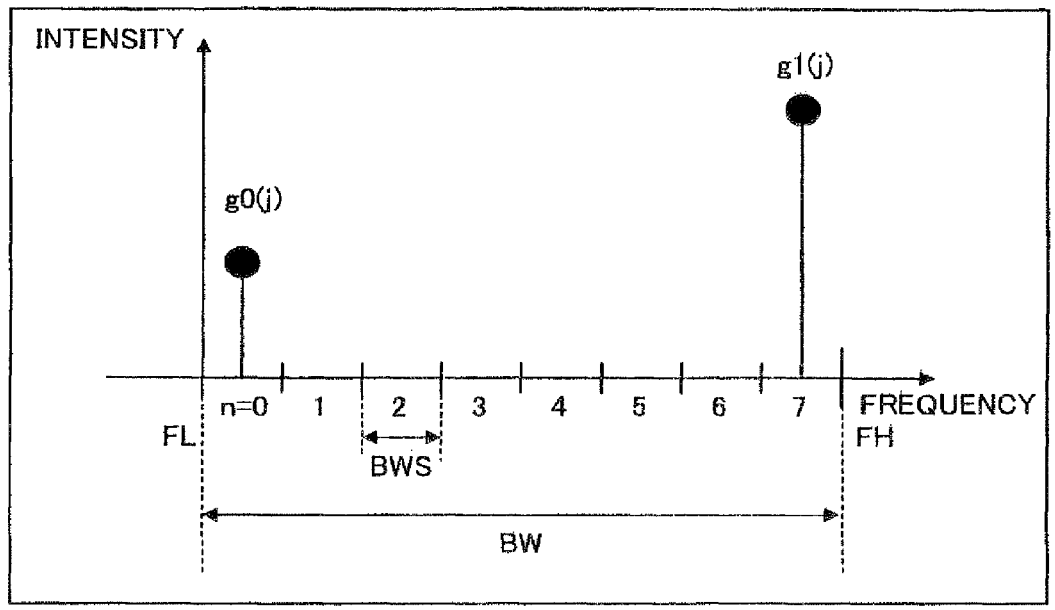
FIG. 22A is a graph for explaining in outline the processing of an extension band gain coding section according to Embodiment 2.
Figure 22B:
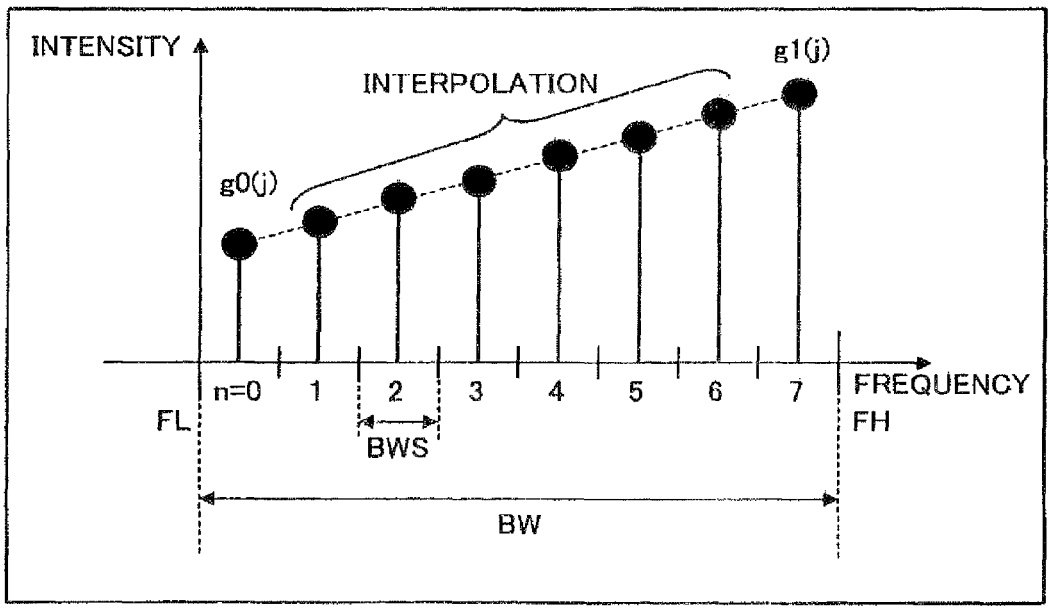
FIG. 22B is a graph for explaining in outline the processing of an extension band gain coding section according to Embodiment 2.

FIGS. 22A and 22B are graphs for explaining in outline the processing of extension band gain coding section 206. Here, also, a case will be described by way of example in which number of subbands N=8.

As shown in FIG. 22A, first element g0(j) of gain candidates G(j) is taken as the 0'th subband gain, and second element g1(j) as the 7th subband gain, and these are allocated to the 1st subband and 7th subband.

Using these gain candidates G(j), interpolation section 216 calculates gain for subbands whose gain has not yet been determined, by means of interpolation.

Specifically, this is performed as shown in FIG. 22B. The 0'th subband gain is given by g0(j), and the 7th subband gain by g1(j), and the gain values of the other subbands are given as interpolated values of g0(j) and g1(j). Based on this concept, gain p(j,n) of the nth subband can be expressed as shown in Equation (9).

$$p(j, n) = g0(j) + \frac{g1(j) - g0(j)}{N - 1} \cdot n \qquad \text{Equation (9)}$$
$$(0 \le n \le N - 1)$$

Subband, gain candidate p(j,n) calculated in this way is sent to multiplication section 213. Multiplication section 213 multiplies together subband amplitude value AE(n) from subband amplitude calculation section 212 and subband gain candidate p(j,n) from interpolation section 216 for each element. If the post-multiplication subband amplitude value is expressed as AE'(n), AE'(n) is calculated in accordance with Equation (10), and is sent to search section 214.

$$AE'(n)=AE(n)\cdot p(j,n) \qquad \text{Equation (10)}$$

Search section 214 calculates distortion between post-multiplication subband amplitude value AE'(n) and second spectrum subband amplitude value AS2(k) sent from subband amplitude calculation section 218. Here, to simplify the explanation, a case in which square distortion is used has been described as an example, but, for example, a distance scale whereby weighting is performed based on auditory sensitivity for each element or the like can also be used as a distortion definition.

Search section 214 calculates square distortion D between AE'(n) and AS2(n) in accordance with Equation (11).

$$D = \sum_{n=0}^{N-1} (AS2(n) - AE'(n))^2 \qquad \text{Equation (11)}$$

Square distortion D may also be expressed as shown in Equation (12).

$$D = \sum_{n=0}^{N-1} w(n) \cdot (AS2(n) - AE'(n))^2 \qquad \text{Equation (12)}$$

In this case, w(n) indicates a weighting function based on auditory sensitivity.

Square distortion D is calculated by means of the above-described processing for all gain quantization value candidates G(j) included in gain codebook 215, and index j of the gain when square distortion D is smallest is output via output terminal 219.

Based on such processing, gain can be determined while smoothly approximating variations in the spectrum outline, enabling the occurrence of degraded sounds to be suppressed and quality to be improved with a small number of bits.

In this embodiment, gain is determined by performing interpolation based on the amount of subband amplitude, but a configuration may also be used whereby interpolation is performed based on subband logarithmic energy instead of subband amplitude. In this case, gain is determined so that the spectrum outline changes smoothly in a domain of logarithmic energy appropriate to human hearing characteristics, with the result that auditory quality is further improved.

Figure 23:
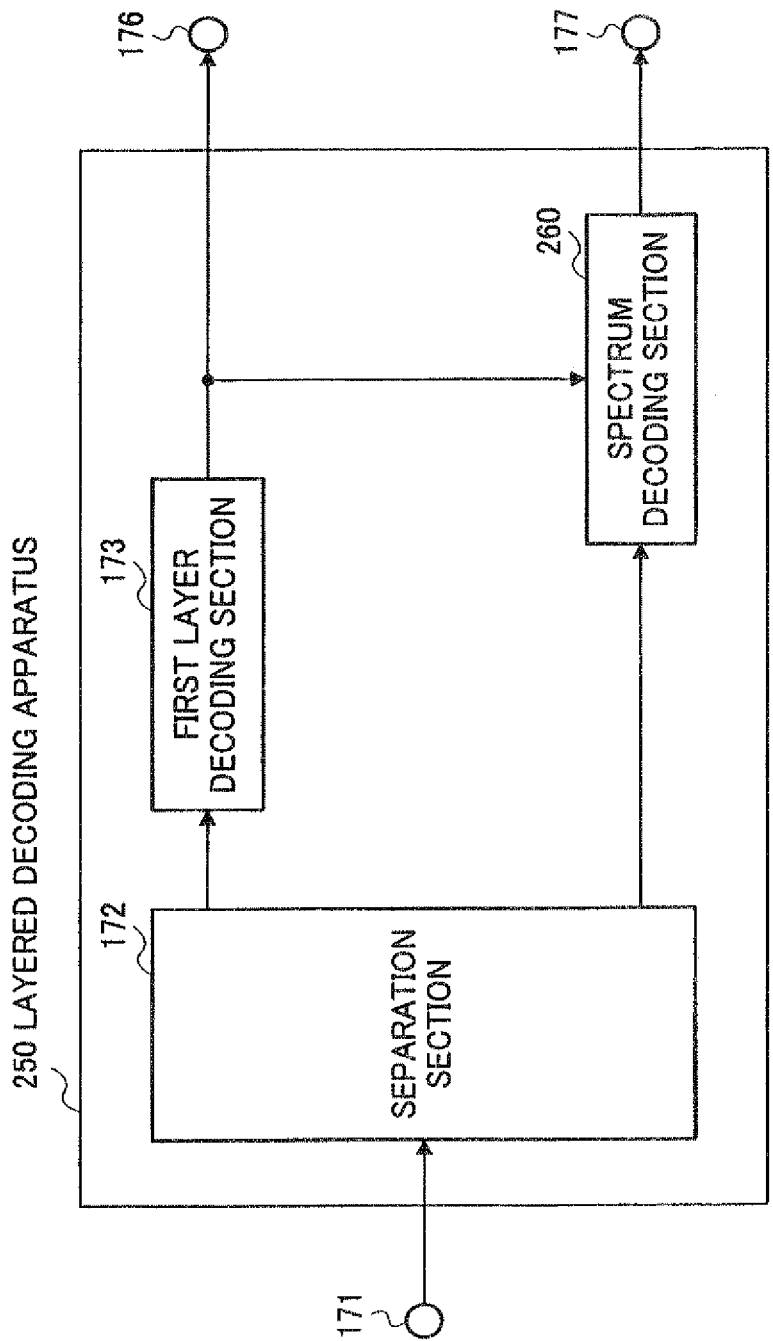
FIG. 23 is a block diagram showing the internal configuration of a layered decoding apparatus according to Embodiment 2.

FIG. 23 is a block diagram showing the internal configuration of a layered decoding apparatus 250 that decodes information coded by above-described layered coding apparatus 200. Here, a case in which layered-coded coding parameters are decoded will be described as an example.

This layered decoding apparatus 250 has an input terminal 171, a separation section 172, a first layer decoding section 173, a spectrum decoding section 260, and output terminals 176 and 177.

A digital demodulated coded sound signal is input to input terminal 171 from RF demodulation apparatus 182. Separation section 172 splits the demodulated coded sound signal input via input terminal 171, and generates, a coding parameter for first layer decoding section 173 and a coding parameter for spectrum decoding section 260. First layer decoding section 173 decodes a decoded signal with a 0≤k<FL signal band using a coding parameter obtained by separation section 172, and sends this decoded signal to the spectrum decoding section. The other output is connected to output terminal 176. By this means, when it is necessary to output a first layer decoded signal generated by first layer decoding section 173, it can be output via this output terminal 176.

The coding parameter separated by separation section 172 and first layer decoded signal obtained by the first layer decoding section are sent to spectrum decoding section 260. Spectrum decoding section 260 performs spectrum decoding described later herein, generates a 0≤k<FH signal band decoded signal, and outputs this signal via output terminal 177. Spectrum decoding section 260 performs processing regarding the first layer decoded signal sent from the first layer decoding section as a first signal.

According to this configuration, when it is necessary to output a first layer decoded signal generated by first layer decoding section 173, it can be output from output terminal 176. Also, if it is necessary to output a higher-quality spectrum decoding section 260 output signal, this signal can be output from output terminal 177. An output terminal 176 or output terminal 177 signal is output from layered decoding apparatus 250, and is input to D/A conversion apparatus 183. Which signal is output is based on an application, user setting, or determination result.

Figure 24:
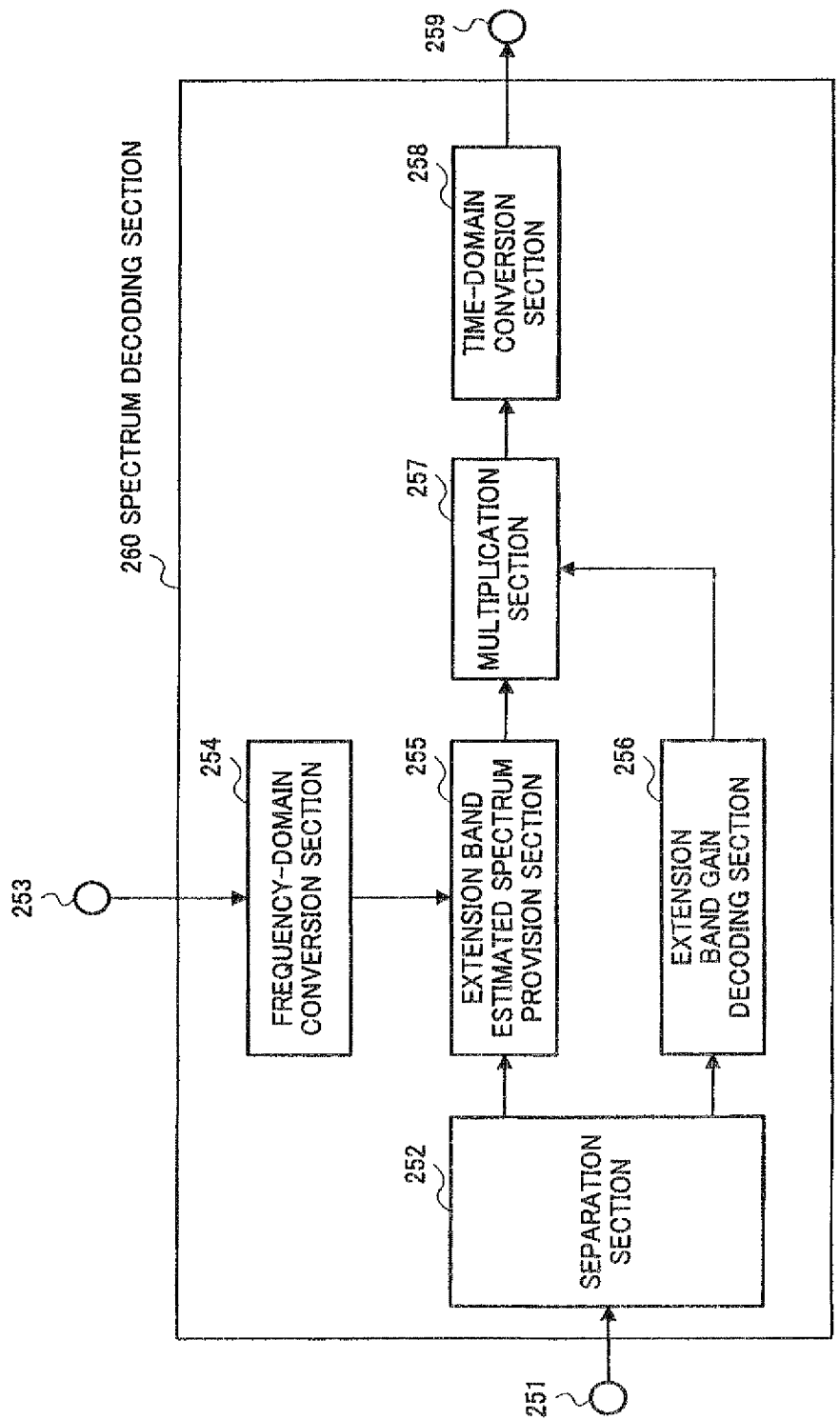
FIG. 24 is a block diagram showing the internal configuration of a spectrum decoding apparatus according to Embodiment 2.

FIG. 24 is a block diagram showing the internal configuration of above-described spectrum decoding section 260.

Spectrum decoding section 260 has input terminals 251 and 253, a separation section 252, a frequency-domain conversion section 254, an extension band estimated spectrum provision section 255, an extension band gain decoding section 256, a multiplication section 257, a time-domain conversion section 258, and an output terminal 259.

Coding parameters coded by spectrum coding section 210 are input from input terminal 251, and the coding parameters are sent to extension band estimated spectrum provision section 255 and extension band gain decoding section 256 respectively via separation section 252. Also, a first signal with a 0≤k<FL valid frequency band is input to input terminal 253. This first signal is the first layer decoded signal decoded by first layer decoding section 173.

Frequency-domain conversion section 254 performs frequency conversion on the time-domain signal input from input terminal 253, and calculates first spectrum $S1(k)$. The frequency conversion method used is discrete Fourier transform (DFT), discrete cosine transform (DCT), modified discrete cosine transform (MDCT), or the like.

Extension band estimated spectrum provision section 255 generates a spectrum included in extension band FL≤k<FH of first spectrum $S1(k)$ from frequency-domain conversion section 254 based on a coding parameter obtained from separation section 252. The generation method depends on the extension band spectrum estimation method used on the coding side, and it is assumed here that estimated spectrum E(k) included in the extension band is generated using first spectrum $S1(k)$. Therefore, combined spectrum F(k) output from extension band estimated spectrum provision section 255 is composed of first spectrum $S1(k)$ in band 0≤k<FL and extension band estimated spectrum E(k) in band FL≤k<FH.

Extension band gain decoding section 256 generates subband gain candidate p(j,n) to be multiplied by the spectrum included in extension band FL≤k<FH of combined spectrum F(k) based on a coding parameter from separation section 252. The method of generating subband gain candidate p(j,n) will be described later herein.

Multiplication section 257 multiplies the spectrum included in FL≤k<FH of combined spectrum F(k) from extension band estimated spectrum provision section 255 by subband gain candidate p(j,n) from extension band gain decoding section 256 in subband units, and generates a decoded spectrum F'(k). Decoded spectrum FR) can be expressed as shown in Equation (13).

$$F'(k) = \begin{cases} F(k) & (0 \leq k < FL) \\ F(k) \cdot p(j, n) & (FL + n \cdot BWS \leq k < FL + (n+1) \cdot BWS) \end{cases} \quad \text{Equation (13)}$$

Time-domain conversion section 258 converts decoded spectrum F'(k) obtained from multiplication section 257 to a time-domain signal, and outputs this signal via output terminal 259. Here, processing such as suitable windowing and overlapped addition is performed as necessary to prevent the occurrence of discontinuities between frames.

Figure 25:
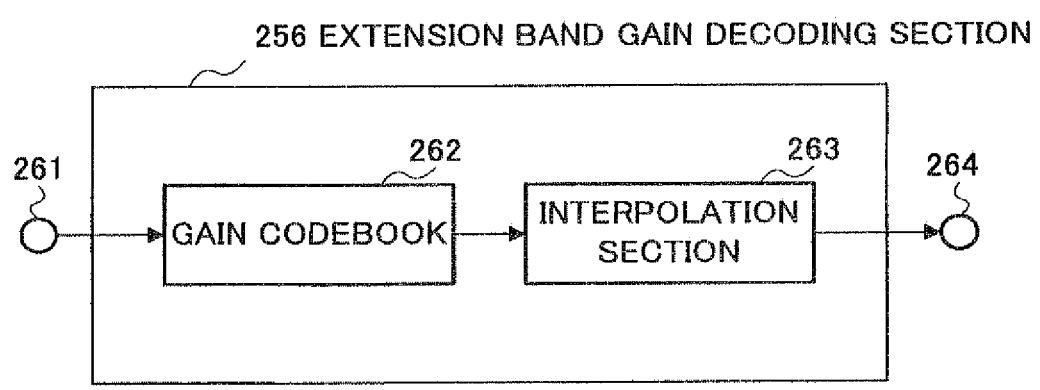
FIG. 25 is a block diagram showing the main internal configuration elements of an extension band gain decoding section according to Embodiment 2.

FIG. 25 is a block diagram showing the main internal configuration elements of above-described extension band gain decoding section 256.

Index j determined by extension band gain coding section 206 on the coding side is input from an input terminal 261, and gain G(j) is selected and output from a gain codebook 262 based on this index information. This gain G(j) is sent to an interpolation section 263, and interpolation section 263 performs interpolation in accordance with the above-described method and generates subband gain candidate p(j,n), and outputs this from an output terminal 264.

According to this configuration, determined gain can be decoded while smoothly approximating variations in the spectrum outline, enabling the occurrence of degraded sounds to be suppressed and quality to be improved.

Thus, according to a decoding apparatus of this embodiment, a configuration is provided that corresponds to the coding method according to this embodiment, enabling a sound signal to be coded efficiently with a small number of bits, and a good sound signal to be output.

Embodiment 3

Figure 26:
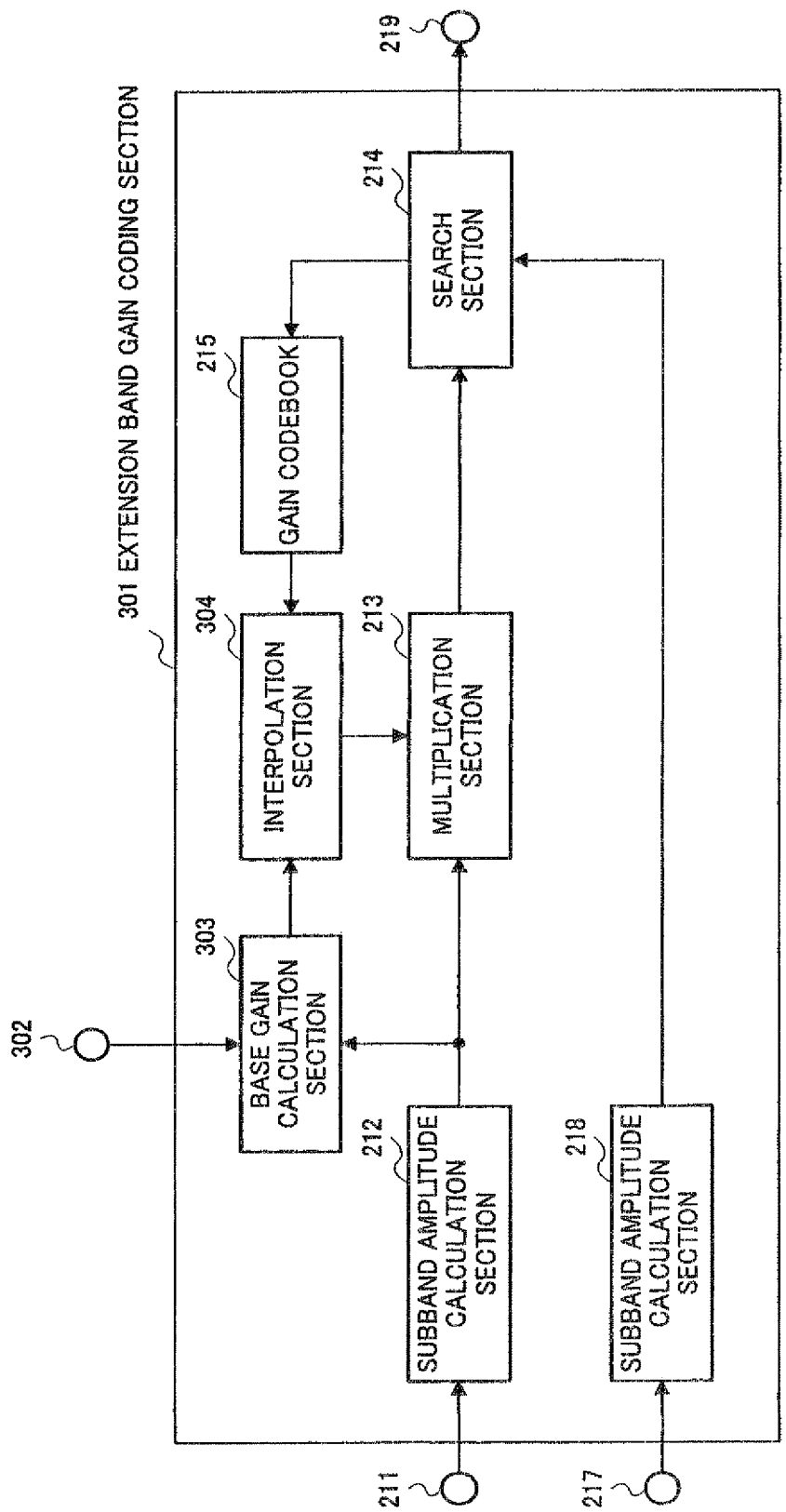
FIG. 26 is a block diagram showing the main internal configuration elements of an extension band gain coding section according to Embodiment 3.

FIG. 26 is a block diagram showing the main internal configuration elements of an extension band gain coding section 301 in a coding apparatus according to Embodiment 3 of the present invention. This extension band gain coding section 301 has a similar basic configuration to extension band gain coding section 206 shown in Embodiment 2, and therefore identical configuration elements are assigned the same codes, and descriptions thereof are omitted.

A characteristic of this embodiment is that the order of gain quantization value candidates G(j) included in the gain codebook is 1—that is, they are scalar values—and gain interpolation is performed between a base gain found based on a base amplitude value provided from an input terminal and a gain quantization value candidate G(j). According to this configuration, since the number of gain values subject to quantization is reduced to 1, lowering of the bit rate is possible.

Figure 27:
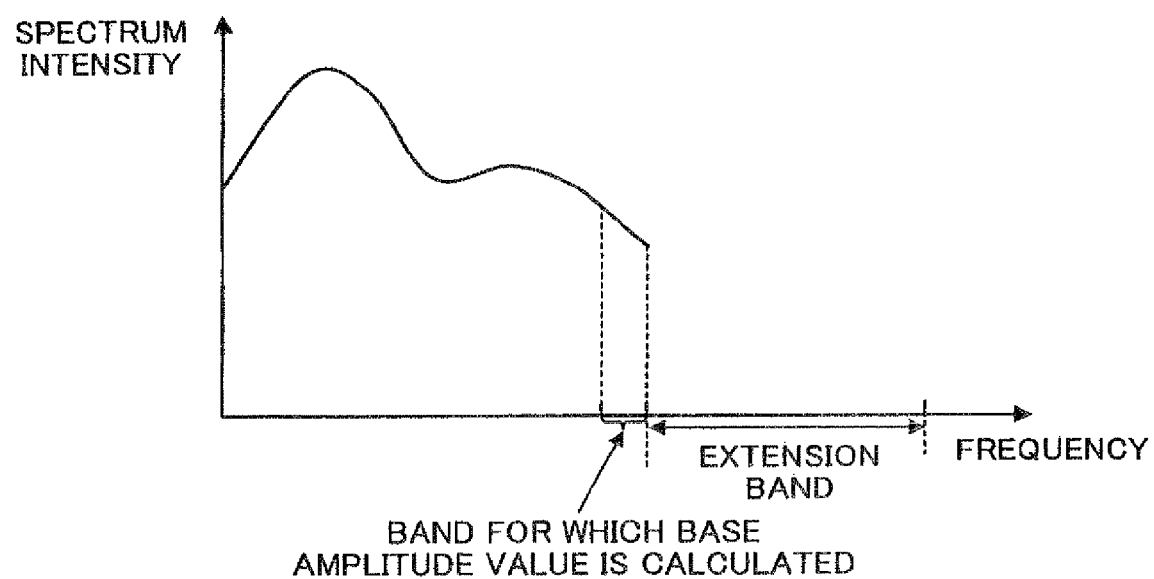
FIG. 27 is a graph for explaining the base amplitude value calculation method.

A base amplitude value input from an input terminal 302, and the lowest-frequency subband amplitude value among subband amplitude values calculated by subband amplitude calculation section 212, are sent to a base gain calculation section 303. The base amplitude value here is assumed to be calculated from the spectrum included in a band adjacent to the extension band, as shown in FIG. 27. Base gain calculation section 303 determines a base gain so as to satisfy the premise that the base amplitude value and the lowest-frequency subband amplitude value coincide. If the base amplitude value is represented by Ab, and the lowest-frequency subband amplitude value by AE(0), base gain gb is expressed as shown in Equation (14).

$$gb = Ab/AE(0) \quad \text{Equation (14)}$$

Figure 28:
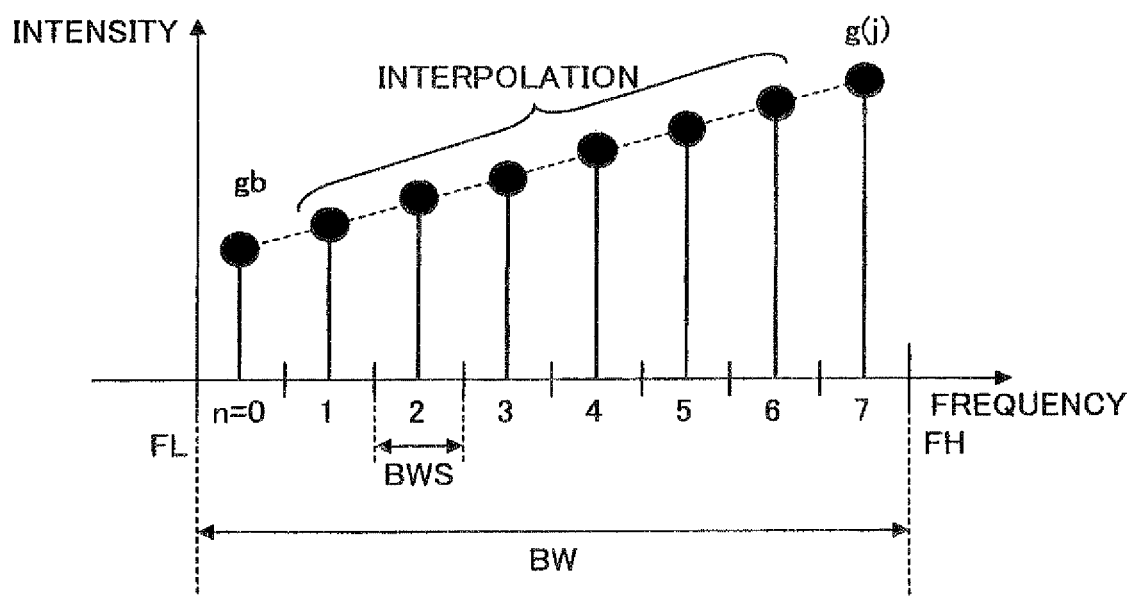
FIG. 28 is a graph for explaining interpolation processing of an interpolation section according to Embodiment 3.

Using base gain gb found by base gain calculation section 303 and gain quantization value candidate g(j) obtained from gain codebook 215, an interpolation section 304 generates the gain of subbands whose gain is undefined by means of interpolation, as shown in FIG. 28. In this figure, number of subbands N=8, and the subbands for which gain is generated by interpolation are the 1st through 6th subbands.

Figure 29:
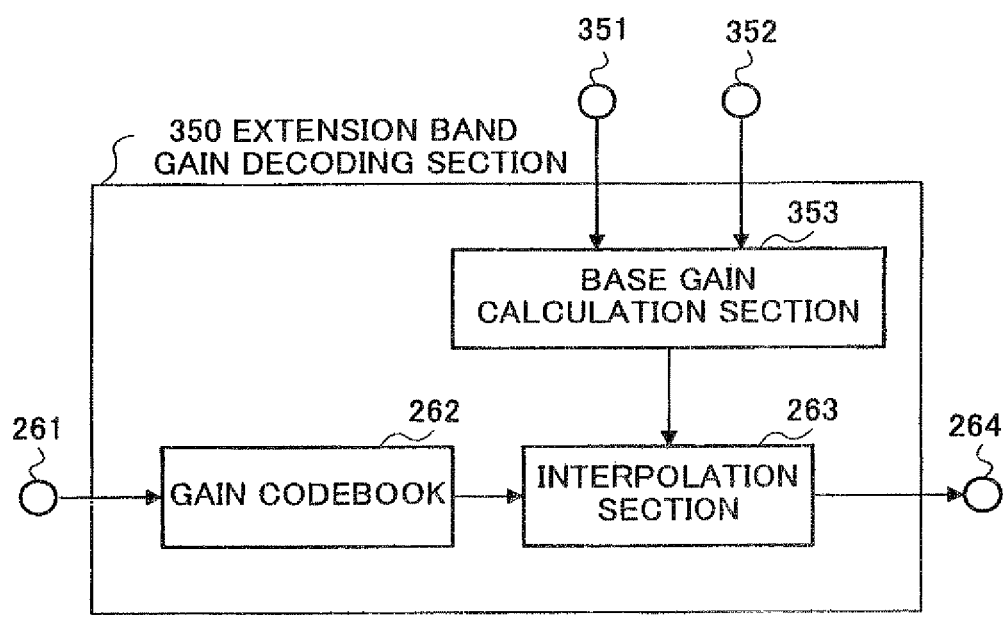
FIG. 29 is a drawing explaining the configuration of a decoding apparatus according to Embodiment 3.

Next, the configuration of a decoding apparatus that decodes a signal coded by a coding apparatus according to this embodiment will be described using FIG. 29. This extension band gain decoding section 350 has a similar basic configuration to extension band gain decoding section 256 shown in Embodiment 2 (see FIG. 25), and therefore identical configuration elements are assigned the same codes, and descriptions thereof are omitted.

Base gain calculation section 353 is supplied with base amplitude value Ab from an input terminal 351, and subband amplitude value AE(0) of the lowest frequency subband in the estimated spectrum of the extension band from an input terminal 352. The base amplitude value here is assumed to be calculated from the spectrum included in a band adjacent to the extension band, as already explained using FIG. 27. Base gain calculation section 353 determines a base gain so as to satisfy the premise that the base amplitude value and the lowest frequency subband amplitude value coincide, as explained for the extension band gain coding section.

Thus, according to this embodiment, the number of gain values subject to quantization is reduced to 1, and further lowering of the bit rate is made possible.

Embodiment 4

Figure 30:
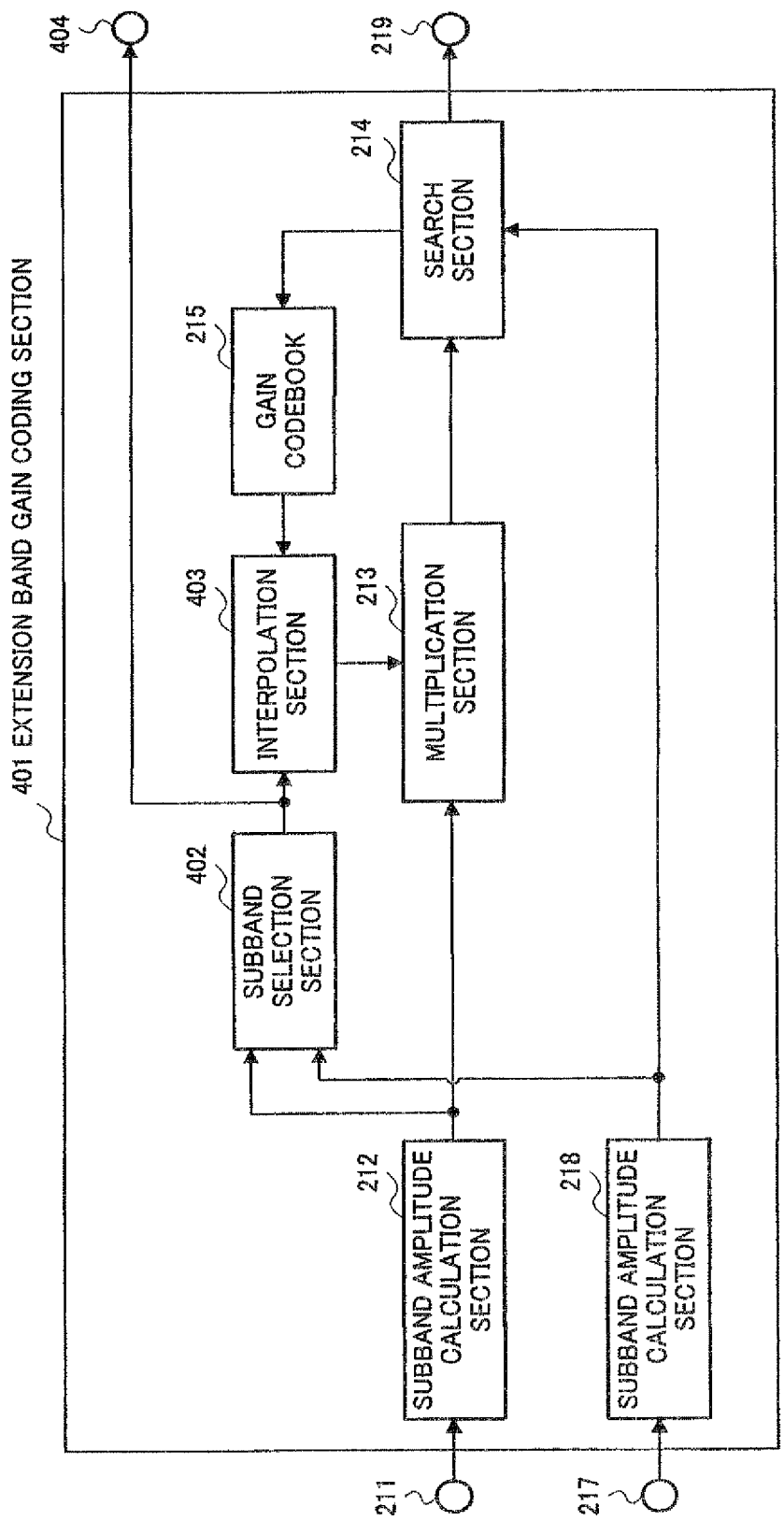
FIG. 30 is a block diagram showing the main configuration elements of an extension band gain coding section according to Embodiment 4.

FIG. 30 is a block diagram showing the main configuration elements of an extension band gain coding section 401 in a coding apparatus according to Embodiment 4 of the present invention. This extension band gain coding section 401 has a similar basic configuration to extension band gain coding section 206 shown in Embodiment 2, and therefore identical configuration elements are assigned the same codes, and descriptions thereof are omitted.

A characteristic of this embodiment is that a subband with an extreme characteristic (such as the highest or lowest gain value, for example) among subbands included in the extension band is always included in the gain codebook search objects. According to this configuration, a subband that is most subject to the influence of gain can be included in the gain codebook search objects, thereby enabling quality to be improved. However, with this configuration, it is necessary to code additional information as to which subband has been selected.

Using subband amplitude value AE(n) of estimated spectrum E(k) found by subband amplitude calculation section 212 and subband amplitude value AS2(n) of second spectrum S2(k) found by subband amplitude calculation section 218, a subband selection section 402 calculates ideal gain value gopt(n) in accordance with Equation (15).

$$gopt(n) = AS2(n)/AE(n) \quad \text{Equation (15)}$$

Next, the subband for which ideal gain value gopt(n) is a maximum (or minimum) is found, and that subband information is output from an output terminal.

Figure 31:
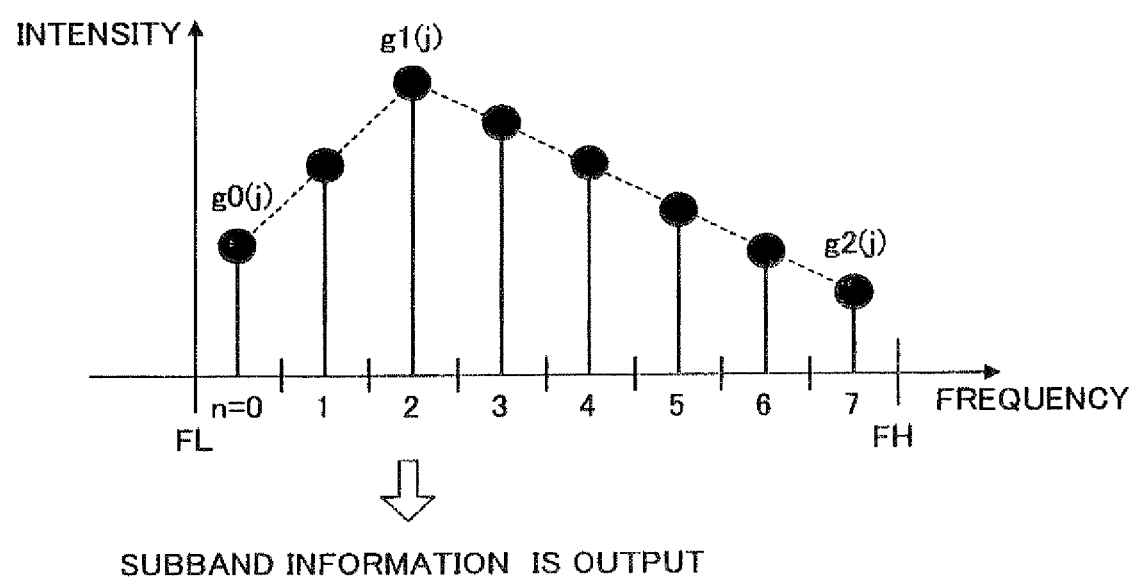
FIG. 31 is a graph for explaining the gain candidate allocation method of an interpolation section according to Embodiment 4.

Based on gain candidates $G(j)=\{g0(j), g1(j), g2(j)\}$ and subband information obtained from subband selection section 402, an interpolation section 403 allocates gain candidates as shown in FIG. 31, and uses interpolation to determine gain for subbands for which gain has not been determined. In this figure, gain candidates are allocated to the 0'th subband and 7th subband by default, and among the 1st through 6th subbands, a gain candidate is allocated to the subband that has the most characteristic gain (in this figure, the 2nd subband), and the gain values of the other subbands are determined by interpolation.

Figure 32:
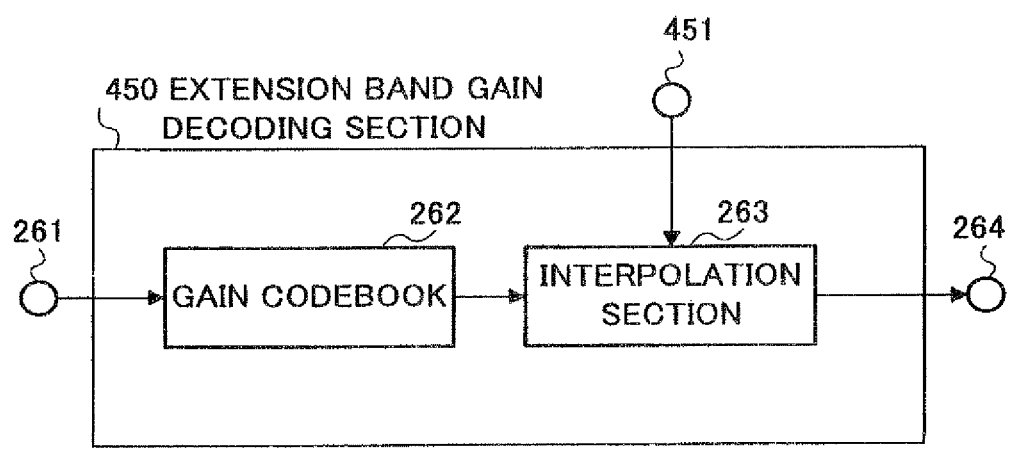
FIG. 32 is a drawing explaining an extension band gain decoding section according to Embodiment 4.

Next, an extension band gain decoding section 450 in a decoding apparatus that decodes a signal coded by a coding apparatus according to this embodiment will be described using FIG. 32. This extension band gain decoding section 450 has a similar basic configuration to extension band gain decoding section 256 shown in Embodiment 2, and therefore identical configuration elements are assigned the same codes, and descriptions thereof are omitted.

Interpolation section 263 allocates $g0(j)$ to the 0'th subband and $g2(j)$ to the 7th subband based on gain $G(j)=\{g0(j), g1(j), g2(j)\}$ obtained from gain codebook 262 and subband information input via an input terminal 451, allocates $g1(j)$ to a subband indicated by subband information, and determines the gain of other subbands by means of interpolation. Subband gain decoded in this way is output from output terminal 264.

Thus, according to this embodiment, a subband that is most subject to the influence of gain is included in the gain codebook search objects and coded, enabling coding performance to be further improved.

This concludes a description of the embodiments of the present invention.

A spectrum coding apparatus according to the present invention is not limited to above-described Embodiments 1 through 4, and various variations and modifications may be possible without departing from the scope of the present invention.

It is also possible for a coding apparatus and decoding apparatus according to the present invention to be provided in a communication terminal apparatus and base station apparatus in a mobile communication system, whereby a communication terminal apparatus and base station apparatus that have the same kind of operational effects as described above can be provided.

Cases have here been described by way of example in which the present invention is configured as hardware, but it is also possible for the present invention to be implemented by software. For example, the same kind of functions as those of a coding apparatus and decoding apparatus according to the present invention can be realized by writing algorithms of a coding method and decoding method according to the present invention in a programming language, storing this program in memory, and having it executed by an information processing section.

The function blocks used in the descriptions of the above embodiments are typically implemented as LSIs, which are integrated circuits. These may be implemented individually as single chips, or a single chip may incorporate some or all of them.

Here, the term LSI has been used, but the terms IC, system LSI, super LSI, ultra LSI, and so forth may also be used according to differences in the degree of integration.

The method of implementing integrated circuitry is not limited to LSI, and implementation by means of dedicated circuitry or a general-purpose processor may also be used. An FPGA (Field Programmable Gate Array) for which programming is possible after LSI fabrication, or a reconfigurable processor allowing reconfiguration of circuit cell connections and settings within an LSI, may also be used.

In the event of the introduction of an integrated circuit implementation technology whereby LSI is replaced by a different technology as an advance in, or derivation from, semiconductor technology, integration of the function blocks may of course be performed using that technology. The adaptation of biotechnology or the like is also a possibility.

The present application is based on Japanese Patent Application No. 2004-148901 filed on May 19, 2004, entire content of which is expressly incorporated herein by reference.

INDUSTRIAL APPLICABILITY

A coding apparatus, decoding apparatus, and method thereof according to the present invention are suitable for use in a communication terminal apparatus or the like in a mobile communication system.

The invention claimed is:

1. A coding apparatus comprising:
    an acquisition section that acquires a spectrum of a voice signal including a low frequency band spectrum and a high frequency band spectrum;
    a first coding section that codes the low frequency band spectrum, to generate first coded information;
    a first decoding section that decodes the first coded information, to generate decoded low frequency band spectrum;
    a generation section that generates a shape of an estimated high frequency band spectrum by duplicating the decoded low frequency band spectrum;
    a first subband amplitude calculation section that divides the estimated high frequency band spectrum into a plurality of subbands and calculates a first average amplitude value of the estimated high frequency band spectrum in each of the plurality of subbands;
    a second subband amplitude calculation section that divides the high frequency band spectrum into a plurality of subbands and calculates a second average amplitude value of the high frequency band spectrum in each of the plurality of subbands;
    a gain codebook that outputs only a gain of specific subbands, the specific subbands including a subband of the estimated high frequency band spectrum adjacent to the low frequency band spectrum among the plurality of subbands of the estimated high frequency band spectrum;
    an interpolation section that finds a gain of a subband of the estimated high frequency band spectrum other than the specific subbands by interpolating the gain of the specific subbands;
    a multiplication section that multiplies the first average amplitude value by the gain output from the gain codebook or the interpolation section in each of the subbands;
    a second coding section that calculates a distortion between a multiplied result of the multiplication section and the second average amplitude value and codes only the gain of the specific subbands when the distortion is smallest; and
    an output terminal that outputs coded information obtained by the first and second coding sections.

2. The coding apparatus according to claim 1, wherein the specific subbands include a subband having a highest frequency band of the estimated high frequency band spectrum.

3. The coding apparatus according to claim 1, wherein
    the specific subbands include a subband having a minimum point of the estimated high frequency band spectrum or a subband having a maximum point of the estimated high frequency band spectrum.

4. A layered coding apparatus that generates coded information having scalability in a frequency axis direction, and uses the coding apparatus according to claim 1 for extension layer coding.

5. A decoding apparatus that decodes coded information relating to a spectrum of a voice signal including a low frequency band spectrum and a high frequency band spectrum, comprising:
    a first decoding section that decodes coded information relating to the low frequency band spectrum, to generate a decoded low frequency band spectrum;
    a second decoding section that decodes coded information relating to the high frequency band spectrum, to generate only a gain of specific subbands, the specific subbands including a subband of the high frequency band spectrum adjacent to the low frequency band spectrum among the plurality of subbands into which the high frequency band spectrum is divided;
    an output terminal that outputs the decoded low frequency band spectrum obtained by the first decoding section and the gains obtained by the second decoding section;
    an interpolation section that finds a gain of a subband other than the specific subbands by interpolating the gain of the specific subbands; and
    a high frequency band spectrum generation section that generates the high frequency band spectrum using the decoded low frequency band spectrum obtained by the first decoding section and the gains obtained by the second decoding section and the interpolation section.

6. A communication terminal apparatus comprising the coding apparatus according to claim 1.

7. A communication terminal apparatus comprising the decoding apparatus according to claim 5.

8. A base station apparatus comprising the coding apparatus according to claim 1.

9. A base station apparatus comprising the decoding apparatus according to claim 5.

10. A coding method comprising:
    an acquisition step of acquiring a spectrum of a voice signal including a low frequency band spectrum and a high frequency band spectrum;
    a first coding step of coding the low frequency band spectrum, to generate first coded information;
    a first decoding step of decoding the first coded information, to generate decoded low frequency band spectrum;
    a generation step of generating a shape of an estimated high frequency band spectrum by duplicating the decoded low frequency band spectrum;
    a first subband amplitude calculation step of dividing the estimated high frequency band spectrum into a plurality of subbands and calculating a first average amplitude value of the estimated high frequency band spectrum in each of the plurality of subbands;
    a second subband amplitude calculation step of dividing the high frequency band spectrum into a plurality of subbands and calculating a second average amplitude value of the high frequency band spectrum in each of the plurality of subbands;
    a gain output step of outputting only a gain of specific subbands, the specific subbands including a subband of the estimated high frequency band spectrum adjacent to the low frequency band spectrum among the plurality of subbands of the estimated high frequency band spectrum;
    an interpolation step of finding a gain of a subband of the estimated high frequency band spectrum other than the specific subbands by interpolating the gain of the specific subbands;
    a multiplication step of multiplying the first average amplitude value by the gain output from the gain output step or the interpolation step in each of the subbands;
    a second coding step of calculating a distortion between a multiplied result of the multiplication step and the second average amplitude value and coding only the gain of the specific subbands when the distortion is smallest; and
    an output step of outputting coded information obtained by the first and second coding steps.

11. A decoding method that decodes coded information relating to a spectrum of a voice signal including a low frequency band spectrum and a high frequency band spectrum, comprising:

a first decoding step of decoding coded information relating to the low frequency band spectrum, to generate a decoded low frequency band spectrum;

a second decoding step of decoding coded information relating to the high frequency band spectrum, to generate only a gain of specific subbands, the specific subbands including a subband of the high frequency band spectrum adjacent to the low frequency band spectrum among the plurality of subbands into which the high frequency band spectrum is divided;

an interpolation step of finding a gain of a subband other than the specific subbands by interpolating the gain of the specific subbands; and a high frequency band spectrum generation step of generating the high frequency band spectrum using the decoded low frequency band spectrum obtained by the first decoding step and the gains obtained by the second decoding step and the interpolation step.

* * * * *

UNITED STATES PATENT AND TRADEMARK OFFICE
CERTIFICATE OF CORRECTION

PATENT NO. : 8,688,440 B2  
APPLICATION NO. : 13/889983  
DATED : April 1, 2014  
INVENTOR(S) : Masahiro Oshikiri Page 1 of 1

It is certified that error appears in the above-identified patent and that said Letters Patent is hereby corrected as shown below:

In the Claims

Claim 2, column 21, line 47:

"quency band of the estimated high frequency hand spectrum."

should read:

"quency band of the estimated high frequency band spectrum.".

Claim 10, column 22, line 30:

"tion, to generate decoded low frequency hand spectrum;"

should read:

"tion, to generate decoded low frequency band spectrum;".

Claim 10, column 22, line 48:

"subbands of the estimated high frequency hand spec-"

should read:

"subbands of the estimated high frequency band spec-".

Signed and Sealed this  
Twelfth Day of August, 2014

Michelle K. Lee  
*Deputy Director of the United States Patent and Trademark Office*